United States Patent
Sano et al.

(10) Patent No.: US 10,336,873 B2
(45) Date of Patent: *Jul. 2, 2019

(54) FUNCTIONAL POLYMER MEMBRANE, MANUFACTURING METHOD THEREFOR, ION EXCHANGE MEMBRANE AND PROTON CONDUCTIVE MEMBRANE EQUIPPED WITH FUNCTIONAL POLYMER MEMBRANE, AND ION EXCHANGE DEVICE

(71) Applicant: FUJIFILM CORPORATION, Tokyo (JP)

(72) Inventors: Satoshi Sano, Kanagawa (JP); Keisuke Kodama, Kanagawa (JP); Tetsufumi Takamoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 573 days.

This patent is subject to a terminal disclaimer.

(21) Appl. No.: 14/826,746

(22) Filed: Aug. 14, 2015

(65) Prior Publication Data

US 2015/0353696 A1    Dec. 10, 2015

Related U.S. Application Data

(63) Continuation of application No. PCT/JP2014/055192, filed on Feb. 28, 2014.

(30) Foreign Application Priority Data

Mar. 7, 2013   (JP) ................................. 2013-045947
Mar. 7, 2013   (JP) ................................. 2013-045948

(51) Int. Cl.
*B32B 27/32*     (2006.01)
*C08J 5/22*      (2006.01)
(Continued)

(52) U.S. Cl.
CPC .......... *C08J 5/2231* (2013.01); *B01D 61/002* (2013.01); *B01D 69/02* (2013.01); *B01D 69/10* (2013.01);
(Continued)

(58) Field of Classification Search
CPC .. B01J 39/20; B01D 67/0006; B01D 2325/14; B01D 69/02; B01D 69/10;
(Continued)

(56) References Cited

FOREIGN PATENT DOCUMENTS

WO   WO 2009104470 A1 *   8/2009   .......... H01M 8/1023
WO   2011/073637 A1       6/2011
(Continued)

OTHER PUBLICATIONS

WO 2009-104470 Machine Translation.*
(Continued)

*Primary Examiner* — Maria V Ewald
*Assistant Examiner* — Zachary M Davis
(74) *Attorney, Agent, or Firm* — Sughrue Mion, PLLC

(57) ABSTRACT

A functional polymer membrane of the present invention contains a polymer containing at least a structure represented by the following Formula (I), a method for producing the membrane, and an ion exchange apparatus:

(Continued)

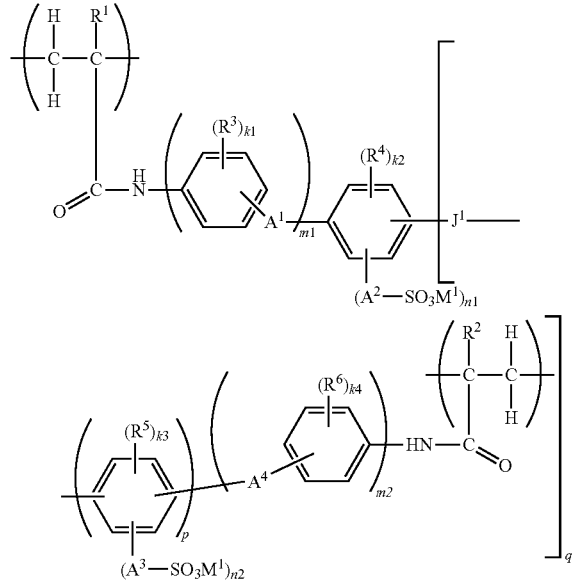

Formula (I)

wherein $R^1$ and $R^2$ each represent a hydrogen atom or an alkyl group; $R^3$ to $R^6$ each represent a substituent; $R^3$ to $R^6$ may be bonded to each other and form a ring; $A^1$ to $A^4$ each represent a single bond or a divalent linking group; $M^1$ represents a hydrogen ion, an organic base ion, or a metal ion; $J^1$ represents a single bond, —O—, —S—, —SO$_2$—, —CO—, —CR$^8$R$^9$—, or an alkenylene group, and $R^8$ and $R^9$ each represent a hydrogen atom, an alkyl group, or a halogen atom; and k1, k2, k3, k4, n1, n2, m1, m2, p, and q each represent a particular integer.

24 Claims, 1 Drawing Sheet

(51) Int. Cl.
| | | |
|---|---|---|
| B01D 69/10 | (2006.01) | |
| B01D 71/56 | (2006.01) | |
| B01J 39/20 | (2006.01) | |
| B01J 47/12 | (2017.01) | |
| B01D 61/00 | (2006.01) | |
| B01D 69/02 | (2006.01) | |
| B01D 71/82 | (2006.01) | |
| C08F 20/56 | (2006.01) | |
| B01D 71/40 | (2006.01) | |

(52) U.S. Cl.
CPC ............. *B01D 71/40* (2013.01); *B01D 71/56* (2013.01); *B01D 71/82* (2013.01); *B01J 39/20* (2013.01); *B01J 47/12* (2013.01); *C08F 20/56* (2013.01); *C08J 5/22* (2013.01); *C08J 5/2268* (2013.01); *B01D 2323/30* (2013.01); *B01D 2325/14* (2013.01); *B01D 2325/18* (2013.01); *B01D 2325/26* (2013.01); *B01D 2325/28* (2013.01); *B01D 2325/30* (2013.01); *C08J 2333/24* (2013.01); *C08J 2335/00* (2013.01); *Y10T 428/249955* (2015.04); *Y10T 428/249991* (2015.04); *Y10T 442/20* (2015.04)

(58) Field of Classification Search
CPC ...... B01D 61/002; B01D 71/40; B01D 71/56; C08J 5/2231
See application file for complete search history.

(56) References Cited

FOREIGN PATENT DOCUMENTS

| WO | 2011/073639 A1 | 6/2011 | |
|---|---|---|---|
| WO | 2013/011272 A1 | 1/2013 | |
| WO | WO 2014114570 A1 * | 7/2014 | ........... C11D 3/0036 |

OTHER PUBLICATIONS

Chopade et al., "Detergent Formulations: Ion Exchange", 2000, Encyclopedia of Separation Science, p. 2560.*
Jung et al., "Synthesis of Crosslinkable m-Aramid Ionomer Containing Sulfonated Ether Sulfone and Their Characterization for PEMFC Membrane", 2010, Polymer (Korea), Polymer Society of Korea, vol. 34, Issue 3, pp. 202-210 (Year: 2010).*
Machine Translation of "Synthesis of Crosslinkable m-Aramid Ionomer Containing Sulfonated Ether Sulfone and Their Characterization for PEMFC Membrane" (Year: 2010).*
Communication dated Mar. 1, 2016 from the European Patent Office in counterpart application No. 14759523.5.
International Preliminary Report on Patentability and Written Opinion, dated Sep. 8, 2015, issued in corresponding International Application No. PCT/JP2014/055192, 5 pages in English.
International Search Report of PCT/JP2014/055192, dated May 20, 2014. [PCT/ISA/210].
Written Opinion of PCT/JP2014/055192, dated May 13, 2014. [PCT/ISA/237].

* cited by examiner

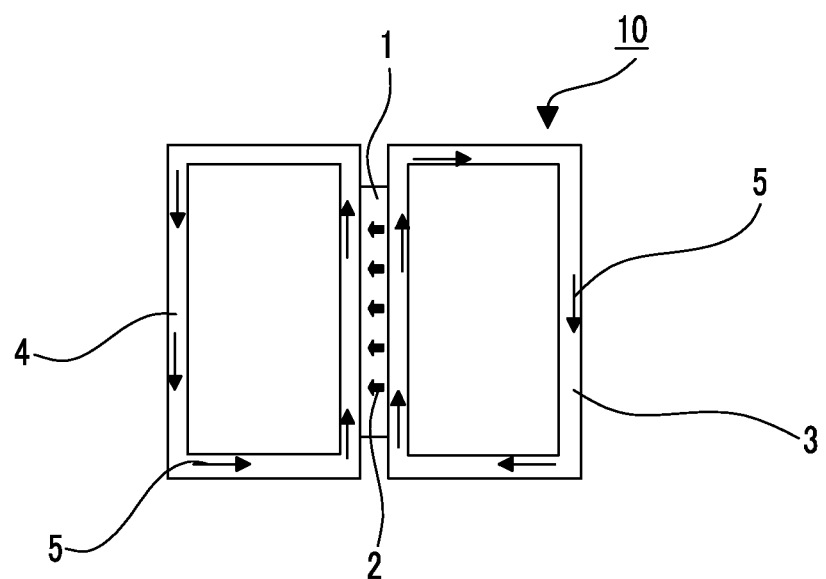

FUNCTIONAL POLYMER MEMBRANE, MANUFACTURING METHOD THEREFOR, ION EXCHANGE MEMBRANE AND PROTON CONDUCTIVE MEMBRANE EQUIPPED WITH FUNCTIONAL POLYMER MEMBRANE, AND ION EXCHANGE DEVICE

CROSS-REFERENCE TO RELATED APPLICATIONS

This application is a Continuation of PCT International Application No. PCT/JP2014/055192 filed on Feb. 28, 2014, which claims priority under 35 U.S.C § 119(a) to Japanese Patent Application No. JP2013-045947 filed on Mar. 7, 2013 and Japanese Patent Application No. 2013-045948 filed on Mar. 7, 2013. Each of the above application(s) is hereby expressly incorporated by reference, in its entirety, into the present application.

BACKGROUND OF THE INVENTION

1. Field of the Invention

The present invention relates to a functional polymer membrane useful for an ion exchange membrane, a fuel cell, a membrane for eliminating protein aggregates or viruses, and the like, a method for producing the membrane, an ion exchange membrane and a proton conductive membrane equipped with a functional polymer membrane, and an ion exchange device.

2. Description of the Related Art

Regarding membranes having various functions as functional polymer membranes, known examples include an ion exchange membrane, a reverse osmosis membrane, a forward osmosis membrane, and a gas separation membrane.

For example, an ion exchange membrane is used for electrodeionization (EDI), continuous electrodeionization (CEDI), electrodialysis (ED), electrodialysis reversal (EDR), and the like.

Electrodeionization (EDI) is a water treatment process for removing ions from an aqueous liquid using an ion exchange membrane and electric potential in order to achieve ion transport. Unlike other water purification technologies such as conventional ion exchange, electrodeionization can be used to produce ultrapure water without requiring the use of chemical agents such as acids or caustic soda. Electrodialysis (ED) and electrodialysis reversal (EDR) are electrochemical separation processes for removing ions and the like from water and other fluids.

In regard to ion exchange membranes, research is being conducted on improvements in ion permselectivity and pH-resistance (see, for example, WO2013/011272A, WO2011/073637A, and WO2011/073639A). However, there is a demand for further enhancement of performance as functional polymer membranes, and thus enhancements of other characteristics of functional polymer membranes are also required.

SUMMARY OF THE INVENTION

According to the research conducted by the inventors of the present invention, it was found that in regard to a conventional functional polymer membrane (hereinafter, also simply referred to as a "membrane"), in order to significantly improve the use as a functional polymer membrane, it is important not only to enhance the ion permselectivity and pH-resistance, but also to further decrease the coefficient of water permeability and electrical resistance of a membrane, and to improve durability. Furthermore, as a result of thickness reduction of a functional polymer membrane along with the size reduction of ion exchange apparatuses and the like in recent years, or as a result of thickness reduction intended to further decrease resistance, the burst strength of membranes has decreased. Therefore, it is becoming more important than ever to increase this membrane strength.

It is an object of the invention to provide a functional polymer membrane having excellent ion permselectivity (hereinafter, also simply referred to as "selective permeability") while having a low coefficient of water permeability and low electrical resistance of the membrane, the functional polymer membrane having excellent pH resistance and durability or having high burst strength, and a method for producing the membrane. The relevant functional polymer membrane can be suitably used as an ion exchange membrane and/or a proton conductive membrane, and it is another object of the invention to provide an ion exchange apparatus which uses this functional polymer membrane.

In order to obtain a functional polymer membrane that meets the requirements described above, the inventors of the present invention paid attention to the structure of the polymer that constitutes a functional polymer membrane, and conducted a thorough investigation. As a result, the inventors found that when a functional polymer membrane which uses a polymer containing a structure represented by the following Formula (I) is used as an ion exchange membrane, the functional polymer membrane exhibits excellent performance in all of permselectivity, pH resistance, coefficient of water permeability, electrical resistance of the membrane, and durability. The invention was achieved based on these findings.

That is, the objects of the invention were solved by the following means.

(1) A functional polymer membrane including a polymer containing at least a structure represented by the following Formula (I):

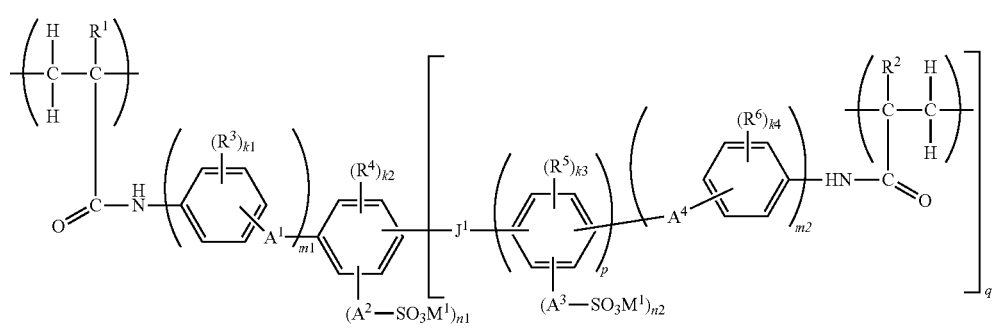

Formula (I)

in which in Formula (I), and $R^2$ each independently represent a hydrogen atom or an alkyl group; $R^3$, $R^4$, $R^5$ and $R^6$ each independently represent a substituent, and k1, k2, k3 and k4 each independently represent an integer from 0 to 4; when $R^3$, $R^4$, $R^5$ and $R^6$ are plural, $R^3$, $R^4$, $R^5$ and $R^6$ may be respectively identical to or different from each other, or may be bonded to each other and form a ring; $A^1$, $A^2$, $A^3$ and $A^4$ each independently represent a single bond or a divalent linking group; $M^1$ represents a hydrogen ion, an organic base ion, or a metal ion; when $M^1$ is plural, $M^1$ may be identical to or different from each other; n1 and n2 each independently represent an integer from 1 to 4, and m1 and m2 each independently represent 0 or 1; $J^1$ represents a single bond, —O—, —S—, —$SO_2$—, —CO—, —$CR^8R^9$—, or an alkenylene group, and $R^8$ and $R^9$ each independently represent a hydrogen atom, an alkyl group, or a halogen atom; and p represents an integer of 1 or larger, and q represents an integer from 0 to 4.

(2) The functional polymer membrane according to (1), in which in Formula (I), q is 0.

(3) The functional polymer membrane according to (1), in which in Formula (I), q represents an integer from 1 to 4.

(4) The functional polymer membrane according to (1), in which the polymer containing at least a structure represented by Formula (I) is a polymer containing a structure represented by the following Formula (I-1):

linking group; $M^1$ represents a hydrogen ion, an organic base ion or a metal ion; when $M^1$ is plural, the plural $M^1$ may be identical to or different from each other; n1 and n2 each independently represent an integer from 1 to 4, and m1 and m2 each independently represent 0 or 1; J' represents a single bond, —O—, —S—, —$SO_2$—, —CO—, —$CR^8R^9$—, or an alkenylene group, and $R^8$ and $R^9$ each independently represent a hydrogen atom, an alkyl group or a halogen atom; and p represents an integer of 1 or more, and qq represents an inter from 0 to 4.

(5) The functional polymer membrane according to any one of (1) to (4), in which in Formula (I), $M^1$ represents an organic base ion.

(6) The functional polymer membrane according to any one of (1) to (5), in which the polymer membrane has a porous support, and the polymer containing at least a structure represented by Formula (I) is formed on at least the surface of the porous support.

(7) The functional polymer membrane according to (6), in which the polymer containing at least a structure represented by Formula (I) is filled in pores of the porous support.

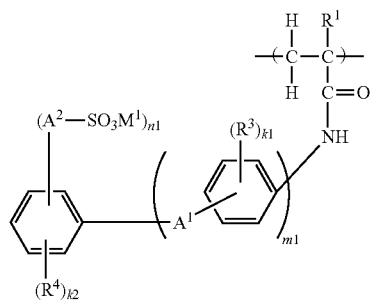

Formula (I-1)

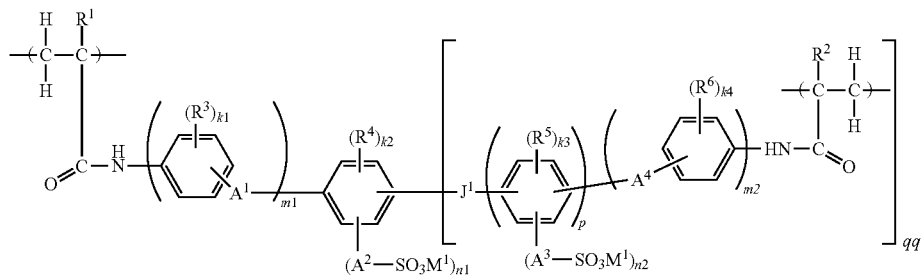

in which in Formula (I-1), $R^1$ and $R^2$ each independently represent a hydrogen atom or an alkyl group; $R^3$, $R^4$, $R^5$ and $R^6$ each independently represent a substituent; k1, k2, k3 and k4 each independently represent an integer from 0 to 4; when $R^3$, $R^4$, $R^5$ and $R^6$ are plural, $R^3$, $R^4$, $R^5$ and $R^6$ may be respectively identical to or different from each other, or may be bonded to each other and form a ring; $A^1$, $A^2$, $A^3$ and $A^4$ each independently represent a single bond or a divalent (8) The functional polymer membrane according to (6) or (7), in which the porous support is a woven fabric or a nonwoven fabric.

(9) The functional polymer membrane according to any one of (1) to (8), which is formed by subjecting a composition containing a polymerizable compound represented by the following Formula (II) to polymerization and a curing reaction:

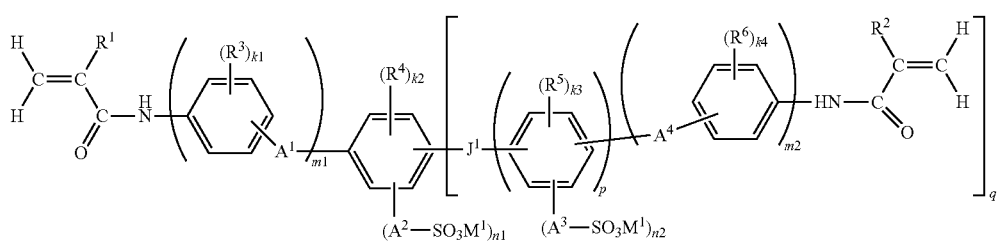

Formula (II)

in which in Formula (II), $R^1$ and $R^2$ each independently represent a hydrogen atom or an alkyl group; $R^3$, $R^4$, $R^5$ and $R^6$ each independently represent a substituent, and k1, k2, k3 and k4 each independently represent an integer from 0 to 4; when $R^3$, $R^4$, $R^5$ and $R^6$ are plural $R^3$, $R^4$, $R^5$ and $R^6$ may be respectively identical to or different from each other, or may be bonded to each other and form a ring; $A^1$, $A^2$, $A^3$ and $A^4$ each independently represent a single bond or a divalent linking group; $M^1$ represents a hydrogen ion, an organic base ion or a metal ion; when $M^1$ is plural, $M^1$ may be identical to or different from each other; n1 and n2 each independently represent an integer from 1 to 4, and m1 and m2 each independently represent 0 or 1; $J^1$ represents a single bond, —O—, —S—, —SO$_2$—, —CO—, —CR$^8$R$^9$—, or an alkenylene group, and $R^8$ and $R^9$ each independently represent a hydrogen atom, an alkyl group or a halogen atom; and p represents an integer of 1 or more, and q represents an inter from 0 to 4.

(10) A method for producing the functional polymer membrane according to any one of (1) to (9), the method including forming a functional polymer membrane containing a polymer containing a structure represented by Formula (I) by irradiating at least one polymerizable compound represented by Formula (II) with active radiation.

(11) An ion exchange apparatus including at least one functional polymer membrane according to any one of (1) to (9).

(12) The functional polymer membrane according to (1), in which the polymer containing a structure represented by Formula (I) is a polymer containing a structure represented by the following Formula (P1), the functional polymer membrane having a structure in which the polymer is on the surface of and/or embedded in the pores (pore section) of the porous support, and having a burst strength of 3.0 kg/cm² or more:

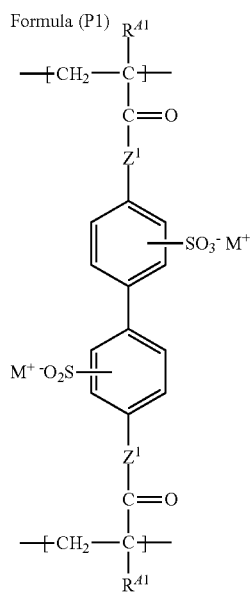

[A]

Formula (P1)

in which in Formula (P1), $R^{41}$ represents a hydrogen atom or an alkyl group; $Z^1$ represents —O— or —NRa-, in which Ra represents a hydrogen atom or an alkyl group; and $M^-$ represents a hydrogen ion or an alkali metal ion.

(13) The functional polymer membrane according to (12), in which the polymer is a polymer containing a structure represented by the following Formula (CP1), which contains at least the following partial structures [A] and [B]:

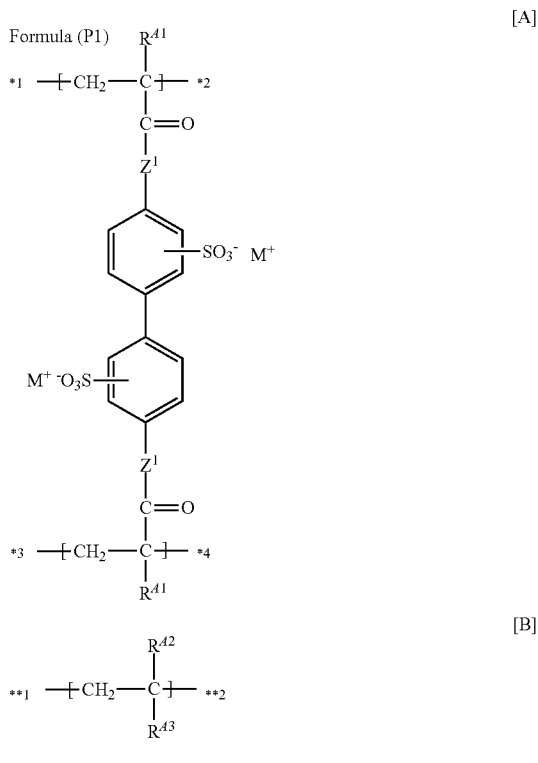

in which in Formula (CP1), $R^{41}$, $Z^1$ and M have the same meanings as $R^{41}$, $Z^1$ and $M^1$ in Formula (P1), respectively; and $R^{42}$ represents a hydrogen atom or an alkyl group, and $R^{43}$ represents an organic group which does not have an ethylenically unsaturated group, in which any one of *1 to *4 of at least one partial structure [A] is bonded to 1 or 2 of at least one partial structure [B].

(14) The functional polymer membrane according to (12) or (13), in which $R^{41}$ and/or $R^2$ represents a hydrogen atom, and $Z^1$ represents —NRa-.

(15) The functional polymer membrane according to any one of (12) to (14), in which $M^+$ represents a sodium ion.

(16) The functional polymer membrane according to any one of (12) to (15), in which the partial structure [A] is the following partial structure [A-1]:

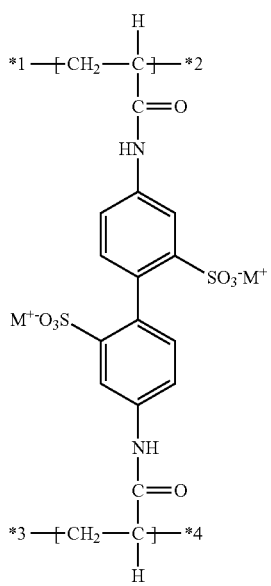

[A-1]

in which in the partial structure [A-1], $M^+$ represents a hydrogen ion or an alkali metal ion; and *1 to *4 represent sites of bonding.

(17) The functional polymer membrane according to any one of (13) to (16), in which the partial structure [B] is the following partial structure [B-2]:

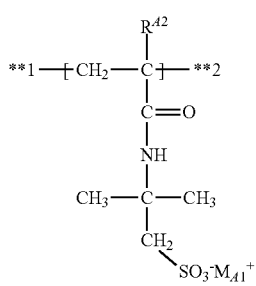

[B-2]

in which in the partial structure [B-2], $R^{A2}$, 1 and 2 have the same meanings as $R^{A2}$, 1 and 2 in the partial structure [B], respectively; and $M_{A1}^-$ represents a hydrogen ion or an alkali metal ion.

(18) The functional polymer membrane according to any one of (12) to (17), in which the functional polymer membrane has a thickness of 150 nm or less.

(19) An ion exchange membrane equipped with the functional polymer membrane according to any one of (12) to (18).

(20) A proton conductive membrane equipped with the functional polymer membrane according to any one of (12) to (18).

(21) A method for producing a functional polymer membrane, the method including forming a polymer containing a structure represented by the following Formula (P1) by subjecting a composition including a compound represented by the following Formula (MA) to a polymerization reaction on the surface of and/or in the pores of a porous support; and thereby producing a functional polymer membrane having a burst strength of 3.0 kg/cm² or more:

Formula (MA)

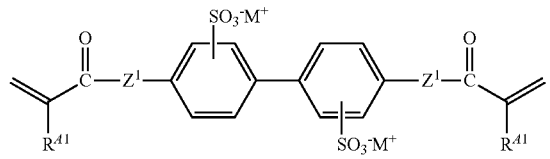

Formula (P1)

[A]

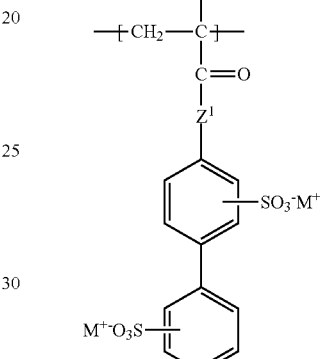

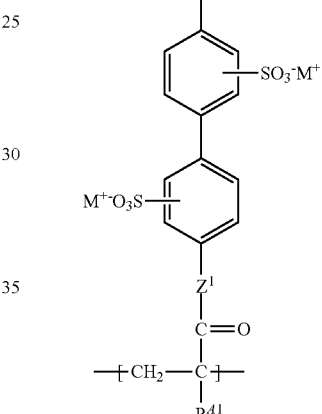

in which in Formulas (MA) and (P1), represents a hydrogen atom or an alkyl group, and $Z^1$ represents —O— or —NRa-, in which Ra represents a hydrogen atom or an alkyl group; and $M^1$ represents a hydrogen ion or an alkali metal ion.

(22) The method for producing a functional polymer membrane according to (21), in which the composition further includes a compound represented by the following Formula (MB), and a polymer containing a structure represented the following Formula (CP1) is formed by a polymerization reaction on the surface of and/or in the pores of a porous support to produce a functional polymer membrane having a burst strength of 3.0 kg/cm² or more:

Formula (MB)

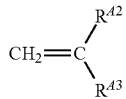

Formula (CP1)

-continued

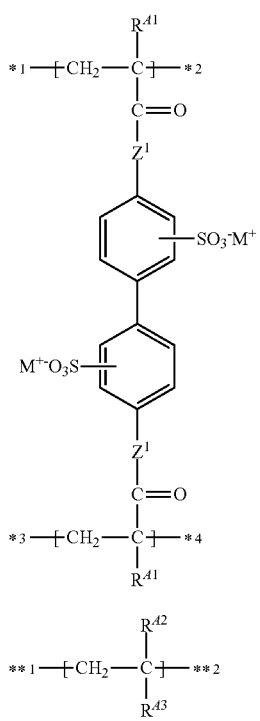

[A]

[B]

in which in Formulas (MB) and (CP1), $R^{41}$, $Z^1$ and $M^+$ have the same meanings as $R^{41}$, $Z^1$ and $M^+$ in Formula (P1), respectively, and $R^{42}$ represents a hydrogen atom or an alkyl group; $R^{43}$ represents an organic group having no ethylenically unsaturated group, in which any one of *1 to *4 of at least one partial structure [A] is bonded to 1 or 2 of at least one partial structure [B].

(23) The method for producing a functional polymer membrane according to (21) or (22), in which when the number of moles of all the polymerizable compounds included in the composition is designated as 100, the number of moles included in the compound represented by Formula (MA) is 28 or more.

(24) The method for producing a functional polymer membrane according to any one of (21) to (23), in which the composition includes a solvent, and the content of the solvent is 5% to 50% by mass.

(25) The method for producing a functional polymer membrane according to any one of (21) to (24), in which the polymerization reaction is carried out under the conditions of irradiating ultraviolet radiation or an electron beam, heating, or a combination thereof.

According to the present specification, the functional polymer membrane having a porous support is a functional composite membrane.

The "burst strength" as used herein refers to the strength measured with a Mullen type burst strength tester.

The symbol "~" as used herein is meant to include the numerical values described before and after the symbol as the lower limit value and the upper limit value. Furthermore, a "dissociable group" refers to a group which can be reversibly decomposed as the component atoms, ions, atomic groups or the like thereof.

According to the invention, the description "(meth)acryl" or the like means —C(=O)CH=CH₂ and —C(=O)C(CH₃)=CH₂, or at least one of —C(=O)CH=CH₂ and —C(=O)C(CH₃)=CH₂. "(Meth)acrylamide" represents acrylamide and methacrylamide, or at least one of acrylamide and methacrylamide, and "(meth)acrylate" represents acrylate and methacrylate, or at least one of acrylate and methacrylate.

Furthermore, in the various formulas, unless particularly stated otherwise, when there are plural groups assigned with the same symbol, these groups may be identical to or different from each other, and similarly, when there are repetitions of plural partial structures, these repetitions mean both identical repetitions, and a mixture of repetitions that are different to a defined extent.

Furthermore, regarding geometric isomers that are substitution styles of double bonds in the various formulas, as a matter of convenience of indication, even if one of the isomers is described, unless particularly stated otherwise, the geometric isomer may be an E-form, a Z-form, or there may be a mixture thereof.

The functional polymer membrane of the invention has excellent capability of suppressing the increase of the coefficient of water permeability, and has excellent ion permselectivity, electrical resistance of the membrane, pH-resistance, and durability, or high burst strength. The functional polymer membrane of the invention can be used in a wide range of applications, and can be suitably used particularly for ion exchange membranes and/or proton conductive membranes. Furthermore, according to the invention, an ion exchange apparatus which uses the relevant functional polymer membrane can be provided.

The features and advantages described above and other features and advantages of the invention will be clarified from the descriptions given below, with appropriate reference to the attached drawing.

BRIEF DESCRIPTION OF THE DRAWING

FIG. 1 is a schematic diagram of flow channels of an apparatus for measuring the coefficient of water permeability of a membrane.

DESCRIPTION OF THE PREFERRED EMBODIMENTS

The functional polymer membrane of the invention (hereinafter, may be simply referred to as "membrane") contains at least a polymer having a structure represented by Formula (I).

The membrane of the invention is formed by subjecting a composition including (A) a polymerizable compound represented by Formula (II) as an essential component, and optionally further including (B) another monofunctional polymerizable compound, (C) a polymerization initiator, (D) a co-sensitizer, (E) a polymerization inhibitor, (F) a solvent, (G) an alkali metal compound, and the like (hereinafter, simply referred to as "composition for forming a functional polymer membrane") to polymerization and a curing reaction.

The functional polymer membrane of the invention can be used to implement ion exchange, fuel cell, selective permeation of ions, proton conduction, removal of protein aggregates or viruses, and the like. Hereinafter, preferred embodiments of the invention will be described by taking an example of the case in which the functional polymer membrane has a function as a cation exchange membrane.

The functional polymer membrane of the invention is a cation exchange membrane.

The thickness of the membrane is, including the support, preferably less than 200 μm, more preferably 5 to 180 μm, and most preferably 10 to 150 μm. The thickness of the membrane as used herein is the thickness of the membrane in a state that the membrane has been impregnated and saturated with a 0.5 M aqueous NaCl solution.

The functional polymer membrane of the invention has an ion exchange capacity of preferably 0.5 meq/g or more, more preferably 0.8 meq/g or more, and particularly preferably 1.2 meq/g or more, relative to the total dry mass of the membrane including an optional porous support and an optional porous reinforcing material.

The functional polymer membrane of the invention has a charge density of preferably 20 meq/m$^2$ or more, more preferably 30 meq/m$^2$ or more, and particularly preferably 40 meq/m$^2$ or more, relative to the area of the dried membrane. Here, meq stands for milliequivalents.

In regard to the functional polymer membrane of the invention, cation permselectivity for a cation such as Na$^+$ is preferably more than 0.9, more preferably more than 0.93, even more preferably more than 0.95, particularly preferably more than 0.96, and most preferably more than 0.97, and it is particularly preferable that the cation permselectivity approaches the theoretical value, 1.0.

The electrical resistance of the functional polymer membrane (membrane resistance) of the invention is preferably less than 10 Ω·cm$^2$, more preferably less than 5 Ω·cm$^2$, and most preferably less than 3 Ω·cm$^2$. Lower electrical resistance is more preferred, and it is preferable to have a value that is lowest in a realizable range, in view of providing the effects of the invention.

The swelling ratio (dimensional change ratio caused by swelling) in water of the functional polymer membrane of the invention is preferably less than 30%, more preferably less than 15%, and most preferably less than 8%. The swelling ratio can be controlled by selecting appropriate parameters in the stage of polymerization and curing.

The amount of water absorption of the functional polymer membrane of the invention is preferably less than 70%, more preferably less than 50%, and particularly preferably less than 40%, relative to the mass of the dried membrane.

The electrical resistance, permselectivity and swelling ratio in water of the membrane can be measured by the methods described in Membrane Science, 319, 217-218 (2008); and Masayuki Nakagaki, Maku-gaku Jikken Ho (Membranology Experimentation), pp. 193-195 (1984).

The coefficient of water permeability of the functional polymer membrane of the invention is preferably 14×10$^{-5}$ mL/m$^2$/Pa/hr or less, more preferably 12×10$^{-5}$ mL/m$^2$/Pa/hr or less, particularly preferably 10×10$^{-5}$ mL/m$^2$/Pa/hr or less, and most preferably 5×10$^{-5}$ mL/m$^2$/Pa/hr or less.

It is preferable that the functional polymer membrane of the invention has high ion permeability, which is represented by 1/membrane resistance, and a low coefficient of water permeability.

In this invention, the ion permeability and the coefficient of water permeability are not individually considered, and as a practical means, a balance is achieved between the increase of ion permeability and the decrease of the coefficient of water permeability. For this reason, comparison of ratios of the coefficient of water permeability and the ion permeability (coefficient of water permeability/ion permeability) is effective as an evaluation criterion.

A lower value of the ratio of coefficient of water permeability/ion permeability is more preferred.

The mass average molecular weight of the polymer that constitutes the functional polymer membrane of the invention is several hundred thousands or more because three-dimensional crosslinking has been achieved, and the mass average molecular weight cannot be substantially measured. In general, the mass average molecular weight is considered to be limitless.

In the following, the invention will be described in detail based on its preferred embodiments.

When the word "compound" or "resin" is used by being appended at the end of the word, or a particular compound is indicated by its name or formula, if the relevant compound has a dissociable partial structure in the chemical structural formula in addition to the compound itself, the term "compound" or "resin" is used to mean inclusion of salts and ions of the compound. Furthermore, when the word "group" is used by being attached to the word end in connection with a substituent in the present specification, or when a particular compound is called by its name, it is implied that the group or the compound may have an optional substituent.

The functional polymer membrane of the invention contains at least one polymer containing a structure represented by the following Formula (I):

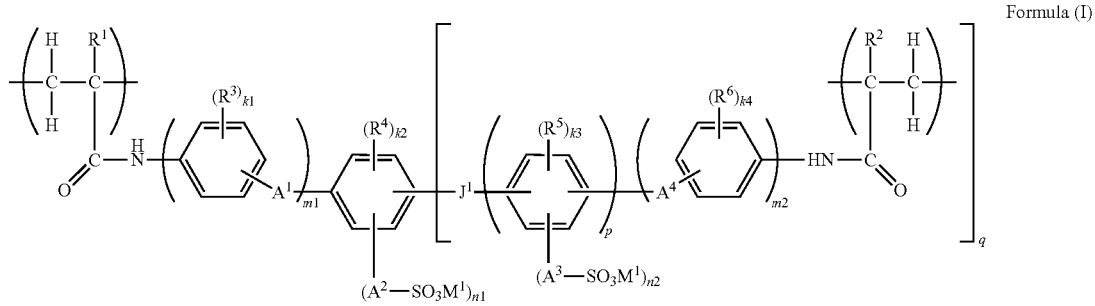

Formula (I)

In Formula (I), R$^1$ and R$^2$ each independently represent a hydrogen atom or an alkyl group. The alkyl group is a linear or branched alkyl group, and the number of carbon atoms is preferably 1 to 10, more preferably 1 to 5, and particularly preferably 1 to 3. Specific examples of the alkyl group include methyl, ethyl, isopropyl, t-butyl, n-octyl, 2-ethylhexyl, n-decyl, and n-hexadecyl. The alkyl group for R$^1$ and R$^2$ may have a substituent, and the substituent is preferably a group selected from the substituent group Z that will be described below.

R$^1$ and R$^2$ each independently represent a hydrogen atom or methyl, and a hydrogen atom is more preferred.

R$^3$, R$^4$, R$^5$ and R$^6$ each independently represent a substituent, and k1, k2, k3 and k4 represent integers from 0 to 4. When there are plural substituents represented by $R^3$, $R^4$, $R^5$ and $R^6$, the plural substituents represented by $R^3$, $R^4$, $R^5$ and $R^6$ may be respectively identical to or different from each other, or may be bonded to each other and form a saturated or unsaturated fused ring.

Examples of the substituent include groups selected from the following substituent group Z.

Substituent group Z:

an alkyl group (an alkyl group preferably having 1 to 30 carbon atoms, more preferably 1 to 20 carbon atoms, and particularly preferably 1 to 10 carbon atoms, and examples include methyl, ethyl, isopropyl, t-butyl, n-octyl, 2-ethylhexyl, n-decyl, and n-hexadecyl), a cycloalkyl group (a cycloalkyl group preferably having 3 to 30 carbon atoms, more preferably 3 to 20 carbon atoms, and particularly preferably 3 to 10 carbon atoms, and examples include cyclopropyl, cyclopentyl, and cyclohexyl), an alkenyl group (an alkenyl group preferably having 2 to 30 carbon atoms, more preferably 2 to 20 carbon atoms, and particularly preferably 2 to 10 carbon atoms, and examples include vinyl, allyl, 2-butenyl, and 3-pentenyl), an alkynyl group (an alkynyl group preferably having 2 to 30 carbon atoms, more preferably 2 to 20 carbon atoms, and particularly preferably 2 to 10 carbon atoms, and examples include propargyl and 3-pentynyl), an aryl group (an aryl group preferably having 6 to 30 carbon atoms, more preferably 6 to 20 carbon atoms, and particularly preferably 6 to 12 carbon atoms, and examples include phenyl, p-methylphenyl, naphthyl, and anthranyl), an amino group (including an amino group, an alkylamino group, and an arylamino group; an amino group preferably having 0 to 30 carbon atoms, more preferably 0 to 20 carbon atoms, and particularly preferably 0 to 10 carbon atoms, and examples include amino, methylamino, dimethylamino, diethylamino, dibenzylamino, diphenylamino, and ditolylamino), an alkoxy group (an alkoxy group preferably having 1 to 30 carbon atoms, more preferably 1 to 20 carbon atoms, and particularly preferably 1 to 10 carbon atoms, and examples include methoxy, ethoxy, butoxy, and 2-ethylhexyloxy), an aryloxy group (an aryloxy group preferably having 6 to 30 carbon atoms, more preferably 6 to 20 carbon atoms, and particularly preferably 6 to 12 carbon atoms, and examples include phenyloxy, 1-naphthyloxy, and 2-naphthyloxy), a heterocyclic oxy group (a heterocyclic oxy group preferably having 2 to 30 carbon atoms, more preferably 2 to 20 carbon atoms, and particularly preferably 2 to 12 carbon atoms, and examples include pyridyloxy, pyrazyloxy, pyrimidyloxy, and quinolyloxy), an acyl group (an acyl group preferably having 1 to 30 carbon atoms, more preferably 1 to 20 carbon atoms, and particularly preferably 1 to 12 carbon atoms, and examples include acetyl, benzoyl, formyl, and pivaloyl), an alkoxycarbonyl group (an alkoxycarbonyl group preferably having 2 to 30 carbon atoms, more preferably 2 to 20 carbon atoms, and particularly preferably 2 to 12 carbon atoms, and examples include methoxycarbonyl, and ethoxycarbonyl), an aryloxycarbonyl group (an aryloxycarbonyl group preferably having 7 to 30 carbon atoms, more preferably 7 to 20 carbon atoms, and particularly preferably 7 to 12 carbon atoms, and examples include a phenyloxycarbonyl group), an acyloxy group (an acyloxy group preferably having 2 to 30 carbon atoms, more preferably 2 to 20 carbon atoms, and particularly preferably 2 to 10 carbon atoms, and examples include acetoxy and benzoyloxy), an acylamino group (an acylamino group preferably having 2 to 30 carbon atoms, more preferably 2 to 20 carbon atoms, and particularly preferably 2 to 10 carbon atoms, and examples include acetylamino and benzoylamino), an alkoxycarbonylamino group (an alkoxycarbonylamino group preferably having 2 to 30 carbon atoms, more preferably 2 to 20 carbon atoms, and particularly preferably 2 to 12 carbon atoms, and examples include methoxycarbonylamino), an aryloxycarbonylamino group (an aryloxycarbonylamino group preferably having 7 to 30 carbon atoms, more preferably 7 to 20 carbon atoms, and particularly preferably 7 to 12 carbon atoms, and examples include phenyloxycarbonylamino), an alkyl- or arylsulfonylamino group (preferably having 1 to 30 carbon atoms, more preferably 1 to 20 carbon atoms, and particularly preferably 1 to 12 carbon atoms, and examples include methanesulfonylaminio and benzenesulfonylamino), a sulfamoyl group (including a sulfamoyl group and an alkyl- or arylsulfamoyl group; a sulfamoyl group preferably having 0 to 30 carbon atoms, more preferably 0 to 20 carbon atoms, and particularly preferably 0 to 12 carbon atoms, and examples include sulfamoyl, methylsulfamoyl, dimethylsulfamoyl, and phenylsulfamoyl), a carbamoyl group (including a carbamoyl group and an alkyl- or arylcarbamoyl group; a carbamoyl group preferably having 1 to 30 carbon atoms, more preferably 1 to 20 carbon atoms, and particularly preferably 1 to 12 carbon atoms, and examples include carbamoyl, methylcarbamoyl, diethylcarbamoyl, and phenylcarbamoyl), an alkylthio group (an alkylthio group preferably having 1 to 30 carbon atoms, more preferably 1 to 20 carbon atoms, and particularly preferably 1 to 12 carbon atoms, and examples include methylthio and ethylthio), an arylthio group (an arylthio group preferably having 6 to 30 carbon atoms, more preferably 6 to 20 carbon atoms, and particularly preferably 6 to 12 carbon atoms, and examples include phenylthio), a heterocyclic thio group (a heterocyclic thio group preferably having 2 to 30 carbon atoms, more preferably 2 to 20 carbon atoms, and particularly preferably 2 to 12 carbon atoms, and examples include pyridylthio, 2-benzimidazolylthio, 2-benzoxazolylthio, and 2-benzothiazolylthio), an alkyl- or arylsulfonyl group (an alkyl- or arylsulfonyl group preferably having 1 to 30 carbon atoms, more preferably 1 to 20 carbon atoms, and particularly preferably 1 to 12 carbon atoms, and examples include mesyl and tosyl), an alkyl- or arylsulfinyl group (an alkyl- or arylsulfinyl group preferably having 1 to 30 carbon atoms, more preferably 1 to 20 carbon atoms, and particularly preferably 1 to 12 carbon atoms, and examples include methanesulfinyl and benzenesulfinyl), a ureido group (a ureido group preferably having 1 to 30 carbon atoms, more preferably 1 to 20 carbon atoms, and particularly preferably 1 to 12 carbon atoms, and examples include ureido, methylureido, and phenylureido), a phosphoric acid amide group (a phosphoric acid amide group preferably having 1 to 30 carbon atoms, more preferably 1 to 20 carbon atoms, and particularly preferably 1 to 12 carbon atoms, and examples include diethyl phosphoric acid amide and phenyl phosphoric acid amide), a hydroxyl group, a mercapto group, a halogen atom (examples include a fluorine atom, a chlorine atom, a bromine atom, and an iodine atom, and more preferred is a fluorine atom), a cyano group, a sulfo group, a carboxyl group, an oxo group, a nitro group, a hydroxamic acid group, a sulfino group, a hydrazino group, an imino group, a heterocyclic group (a heterocyclic group preferably having 1 to 30 carbon atoms, and more preferably 1 to 12 carbon atoms, and the ring-constituting heteroatom is preferably, for example, a nitrogen atom, an oxygen atom, and a sulfur atom; specific examples include imidazolyl, pyridyl, quinolyl, furyl, thienyl, piperidyl, morpholino, benzoxazolyl, benzimidazolyl, benzothiazolyl, carbazolyl, and azepinyl), a silyl group (a silyl group preferably having 3 to 40 carbon atoms, more preferably 3 to 30 carbon atoms, and particularly preferably 3 to 24 carbon atoms, and examples include trimethylsilyl and triphenylsilyl), and a silyloxy group (a silyloxy group preferably having 3 to 40 carbon atoms, more preferably 3 to 30 carbon atoms, and particularly preferably 3 to 24 carbon atoms, and examples include trimethylsilyloxy and triphenylsilyloxy). These substituents may be further substituted with any one or more substituents selected from the above substituent group Z.

Meanwhile, according to the invention, when there are plural substituents at one structural site, those substituents may be linked to each other and form a ring, or may form a fused ring with a portion or the entirety of the structural sites described above and thereby form an aromatic ring or an unsaturated heterocyclic ring.

$A^1$, $A^2$, $A^3$ and $A^4$ each independently represent a single bond or a divalent linking group. Examples of the divalent linking group include a linear, branched or cyclic alkylene group (an alkylene group preferably having 1 to 30 carbon atoms, more preferably 1 to 12 carbon atoms, and even more preferably 1 to 4 carbon atoms, and examples include methylene, ethylene, propylene, butylene, pentylene, hexylene, octylene, and decylene; meanwhile, in the case of a cyclic alkylene group, that is, a cycloalkylene group, a cycloalkylene group preferably having 3 to 12 carbon atoms, more preferably 3 to 8 carbon atoms, and even more preferably 3 to 6 carbon atoms, is preferred), a linear, branched or cyclic alkynylene group (an alkenylene group preferably having 2 to 30 carbon atoms, more preferably 2 to 12 carbon atoms, and even more preferably 2 to 4 carbon atoms, and examples include ethenylene and propenylene; meanwhile, the cyclic alkenylene group is preferably a cycloalkenylene group having a 5-membered or 6-membered ring), an alkyleneoxy group (an alkyleneoxy group preferably having 1 to 30 carbon atoms, more preferably 1 to 12 carbon atoms, and even more preferably 1 to 4 carbon atoms, and examples include methyleneoxy, ethyleneoxy, propyleneoxy, butyleneoxy, pentyleneoxy, hexyleneoxy, octyleneoxy, and decyleneoxy), an aralkylene group (an aralkylene group preferably having 7 to 30 carbon atoms, and more preferably 7 to 13 carbon atoms, and examples include benzylidene and cinnamylidene), an arylene group (an arylene group preferably having 6 to 30 carbon atoms, and more preferably 6 to 15 carbon atoms, and examples include phenylene, cumenylene, mesitylene, tolylene, and xylene), an ether group (—O—), a thioether group (—S—), a sulfonyl group (—$SO_2$—), and a carbonyl group (—C(=O)—). These may further have a substituent. Also, the substituent is preferably a hydroxyl group or a halogen atom.

$M^1$ represents a hydrogen ion, an organic base ion, or a metal ion. Examples of the organic base ion include organic base ions selected from ammonium ions (for example, ammonium, methylammonium, dimethylammonium, trimethylammonium, diethylammonium, triethylammonium, and dibenzylammonium), and organic heterocyclic ions (a nitrogen-containing heterocyclic ion is preferred, and the heterocyclic ring in the nitrogen-containing heterocyclic ion is preferably a 5-membered or 6-membered ring and may be any of an aromatic ring or a simple heterocyclic ring; the heterocyclic ring may also be fused with another ring such as a benzene ring, or may form a spiro ring or a bridged ring; examples include pyridinium, N-methylimidazolium, N-methylmorpholium, 1,8-diazabicyclo[5.4.0]-7-undecanium, 1,8-diazabicyclo[4.3.0]-7-nonenium, and guanidium). Examples of the metal ion include metal ions selected from alkali metal ions (for example, lithium ion, sodium ion, and potassium ion), and alkaline earth metal ions (for example, beryllium ion, magnesium ion, and calcium ion), and an alkali metal ion is preferred. When there are plural $M^1$'s, the plural $M^1$'s may be identical to or different from each other.

$M^1$ is preferably a hydrogen ion, an organic base ion, or an alkali metal ion, and a hydrogen ion, an organic heterocyclic ion, a lithium ion, a sodium ion, or a potassium ion is more preferred, while more preferably, a hydrogen ion, pyridinium, N-alkylmorpholinium (preferably, N-methylmorpholinium), N-alkylimidazolium (preferably, N-methylimidazolium), a lithium ion, or a sodium ion is particularly preferred.

n1 and n2 each independently represent an integer from 1 to 4, and m1 and m2 each represent 0 or 1.

n1 and n2 are each independently preferably 1 to 3, more preferably 1 or 2, and particularly preferably 1. m1 and m2 are each 0 or 1, and preferably 0.

$J^1$ represents a single bond, —O—, —S—, —$SO_2$—, —CO—, —$CR^8R^9$—, or an alkenylene group, and $R^8$ and $R^9$ each independently represent a hydrogen atom, an alkyl group, or a halogen atom.

$J^1$ is preferably a single bond, —O—, —S—, —$SO_2$—, —CO—, —$CR^8R^9$—, or an alkenylene group (preferably, an ethylene group); more preferably a single bond, —$SO_2$—, —$CR^8R^9$—, or an alkenylene group; and particularly preferably a single bond.

$R^8$ and $R^9$ are each independently an alkyl group or a halogen atom, and more preferably a methyl group or a fluorine atom.

p represents an integer of 1 or more, and is preferably 1 to 5, more preferably 1 to 3, and particularly preferably 1. q represents an integer from 0 to 4, and is preferably 0 to 3, more preferably 0 to 2, and particularly preferably 0 or 1.

The polymer containing a structure represented by Formula (I) is preferably a polymer containing a structure represented by the following Formula (III):

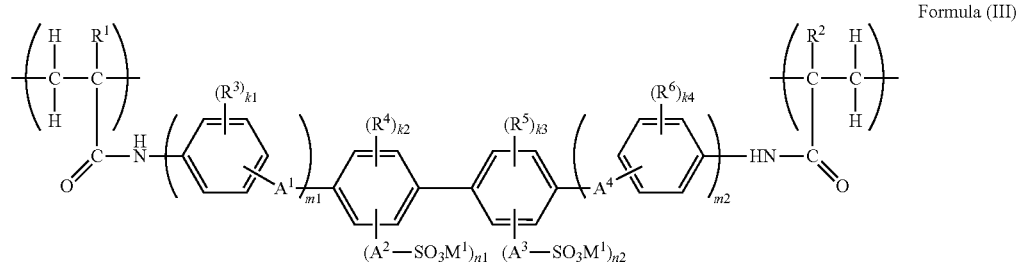

Formula (III)

wherein in Formula (III), $R^1$, $R^2$, $R^3$, $R^4$, IV, $R^6$, k1, k2, k3, k4, $A^1$, $A^2$, $A^3$, $A^4$, $M^1$, n1, n2, m1 and m2 have the same meanings as $R^1$, $R^2$, $R^3$, $R^4$, $R^5$, $R^6$, k1, k2, k3, k4, $A^1$, $A^2$, $A^3$, $A^4$, $M^1$, n1, n2, m1 and m2 in Formula (I), respectively, and preferred ranges thereof are also the same.

Hereinafter, the component (A) as an essential component, the components (B) to (G) as optional components, and other components included in the composition for forming a functional polymer membrane according to the invention, and the support will be explained.

(A) Polymerizable Compound Represented by Formula (II)

The functional polymer membrane of the invention is formed by subjecting a composition for forming a functional polymer membrane, which includes a polymerizable compound represented by the following Formula (II), to a polymerization reaction, that is, a polymerization curing reaction.

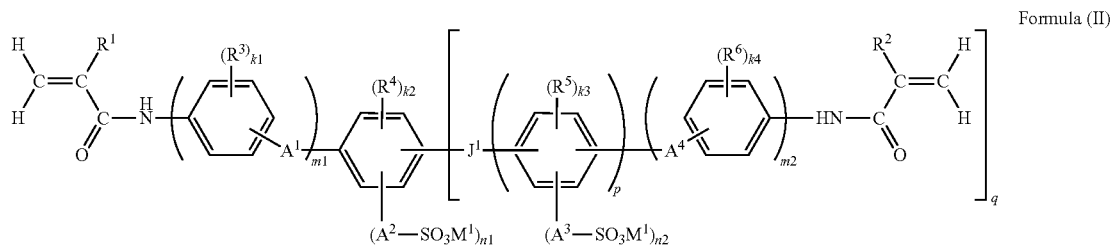

Formula (II)

wherein in Formula (II), $R^1$, $R^2$, $R^3$, $R^4$, $R^5$, k1, k2, k3, k4, $A^1$, $A^2$, $A^3$, $A^4$, $M^1$, n1, n2, m1, m2, $J^1$, p, and q have the same meanings as $R^1$, $R^2$, $R^3$, $R^4$, $R^5$, k1, k2, k3, k4, $A^2$, $A^3$, $A^4$, $M^1$, n1, n2, m1, m2, $J^1$, p, and q in Formula (I), respectively, and preferred ranges thereof are also the same.

Among the polymerizable compounds represented by Formula (II), a compound in which q is 0, is a monofunctional polymerizable compound and is intended for introducing an anion group to the polymer. It is preferable to use the relevant compound in combination with a divalent or higher-valent polyfunctional polymerizable compound (also referred to as a crosslinking agent).

Among the polymerizable compounds represented by Formula (II), a compound in which q represents an integer from 1 to 4 is a polyfunctional polymerizable compound, and is useful for introducing an anion group to the polymer, or is useful as a crosslinking agent for obtaining membrane strength of the functional polymer membrane simultaneously with the introduction of an anion group.

Here, the polymerizable compound in which q is 0 is represented by the following Formula (II-A), and the polymerizable compound in which q represents an integer from 1 to 4 is represented by the following Formula (II-B).

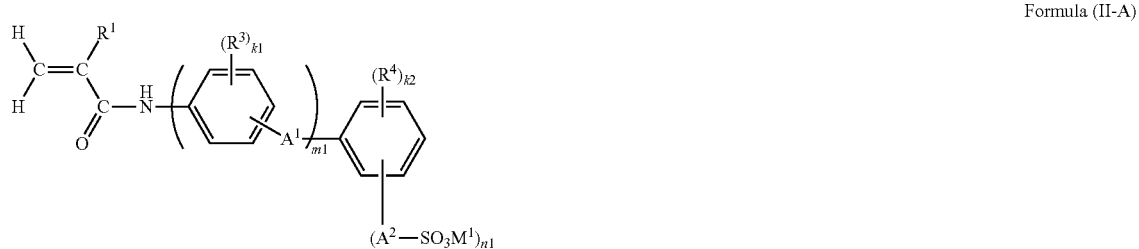

Formula (II-A)

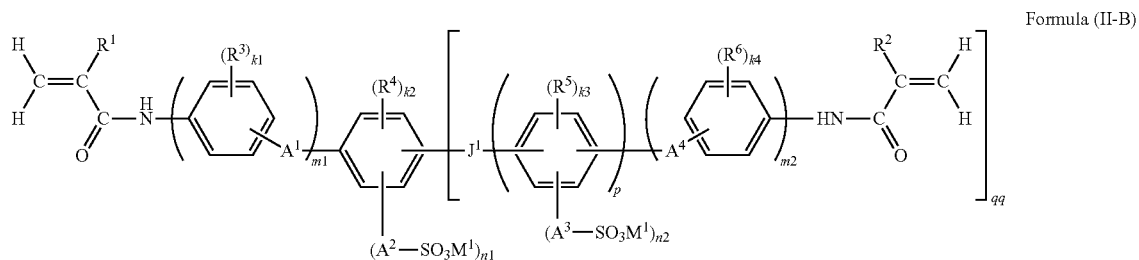

Formula (II-B)

The divalent or higher-valent polyfunctional polymerizable compound may be, among the polymerizable compounds represented by Formula (II), a polymerizable compound in which q represents an integer from 1 to 4, or may be another divalent or higher-valent polyfunctional polymerizable compound; however, among the polymerizable compounds represented by Formula (II), a polymerizable compound in which q represents an integer from 1 to 4 is preferred. Furthermore, according to the invention, a functional polymer membrane obtained by subjecting a monofunctional polymerizable compound in which q in Formula (II) is 0, and a polyfunctional polymerizable compound in which q in Formula (II) is 1, 2, 3 or 4, to a polymerization curing reaction, is preferred.

wherein in Formulas (II-A) and (II-B), while qq represents an integer from 1 to 4, the remaining respective groups have the same meanings as the corresponding groups in Formula (II), and preferred ranges thereof are also the same.

Here, the polymer formed by subjecting the polymerizable compound represented by Formula (II-A) and the polymerizable compound represented by Formula (II-B) to a polymerization reaction, that is, a polymerization curing reaction, forms a copolymer, and is imparted with a structural unit derived from the polymerizable compound represented by Formula (II-A) as a copolymerization partner. Thus, the polymer is represented as a polymer containing a structure represented by the following Formula (I-1):

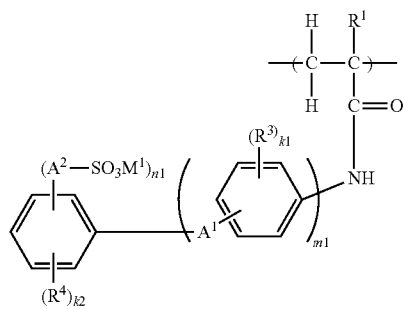

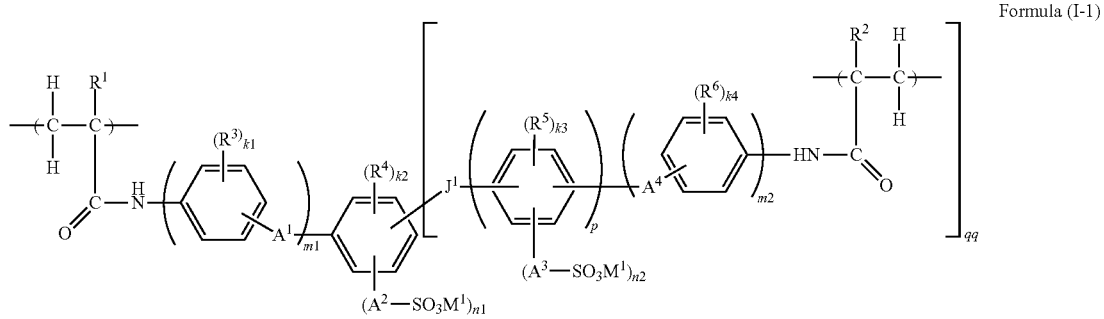

Formula (I-1)

wherein in Formula (I-1), the various substituents all have the same meanings as the relevant substituents in Formulas (II-A) and (II-B), respectively, and preferred ranges thereof are also the same.

Meanwhile, the combination ratio of the polymerizable compound represented by Formula (II-A) and the polymerizable compound represented by Formula (II-B) is, as a molar ratio, preferably 5:95 to 95:5, more preferably 20:80 to 80:20, and particularly preferably 30:70 to 70:30.

As such, when a polymerizable compound in which q is 0 and a polymerizable compound in which q is 1 or more are copolymerized, this is preferable because a membrane having a low coefficient of water permeability and excellent mechanical strength can be obtained.

The polymerizable compound represented by Formula (II) is more preferably a polymerizable compound represented by the following Formula (IV):

present specification, also referred to as "porous support"), and it is preferable that a polymer containing at least a structure represented by Formula (I) is formed at least on the surface of this porous support.

Next, preferred specific examples of the polymerizable compound represented by Formula (II) according to the invention are described below; however, the invention is not intended to be limited to these.

Meanwhile, M-1 to M-10 are monofunctional polymerizable compounds and act as monomers for introducing anion groups, and M-11 to M-22 are polyfunctional polymerizable compounds and act as monomers for introducing anion groups or as crosslinking agents that also act as monomers for introducing anion groups.

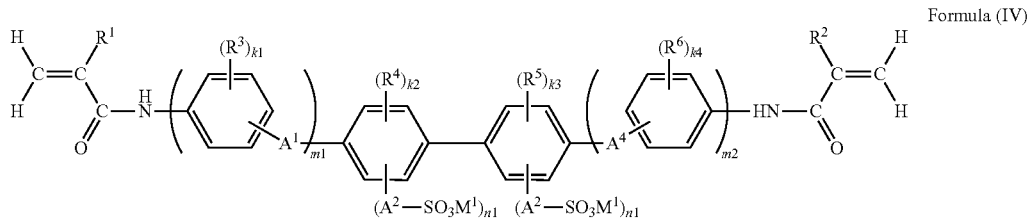

Formula (IV)

wherein in Formula (IV), $R^1$, $R^2$, $R^3$, $R^4$, $R^5$, $R^6$, k1, k2, k3, k4, $A^1$, $A^2$, $A^3$, $A^4$, n1, n2, m1 and m2 have the same meanings as $R^1$, $R^2$, $R^3$, $R^4$, $R^5$, $R^6$, k1, k2, k3, k4, $A^1$, $A^2$, $A^3$, $A^4$, $M^1$, n1, n2, m1 and m2 in Formula (II), respectively, and preferred ranges thereof are also the same.

It is preferable that the functional polymer membrane of the invention has a support with porosity (according to the

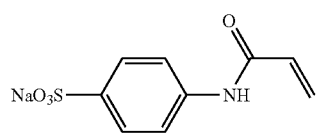

M-1

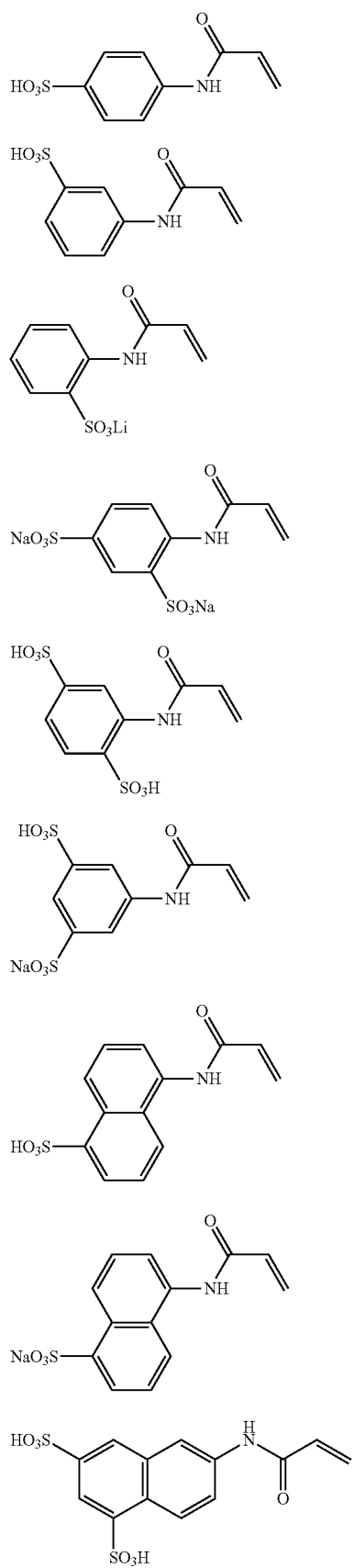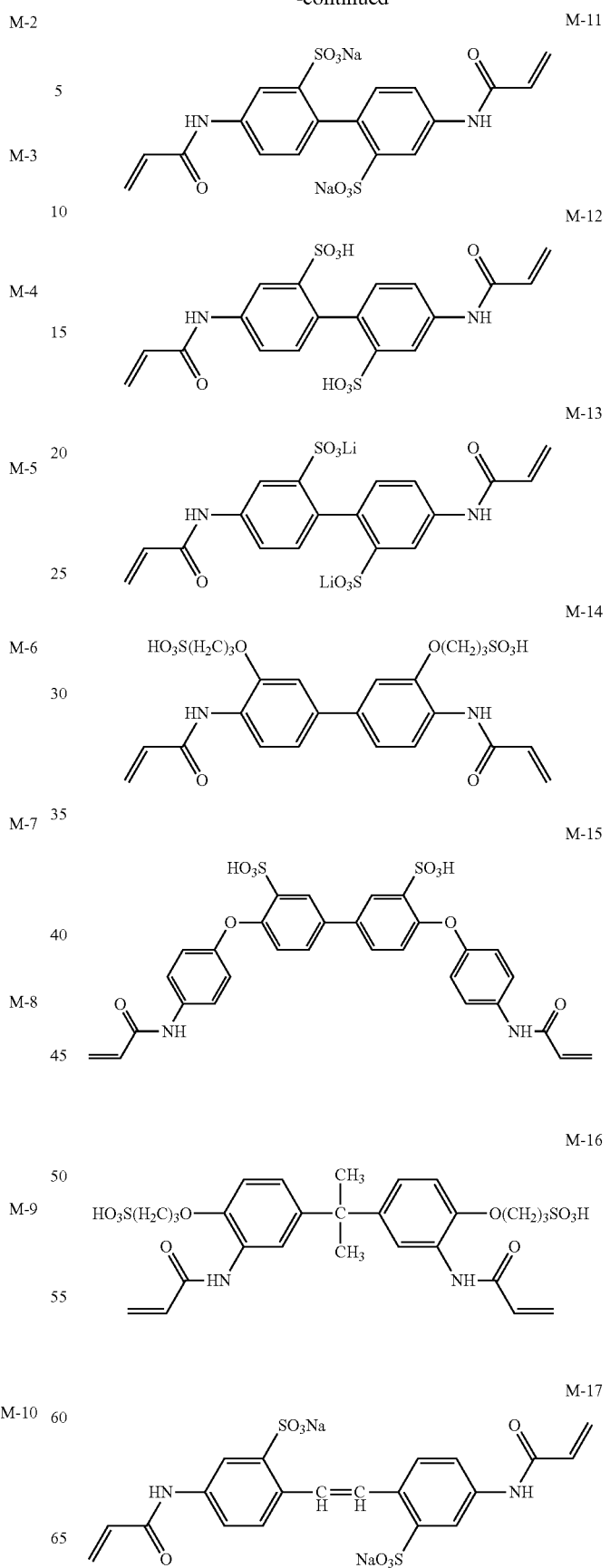

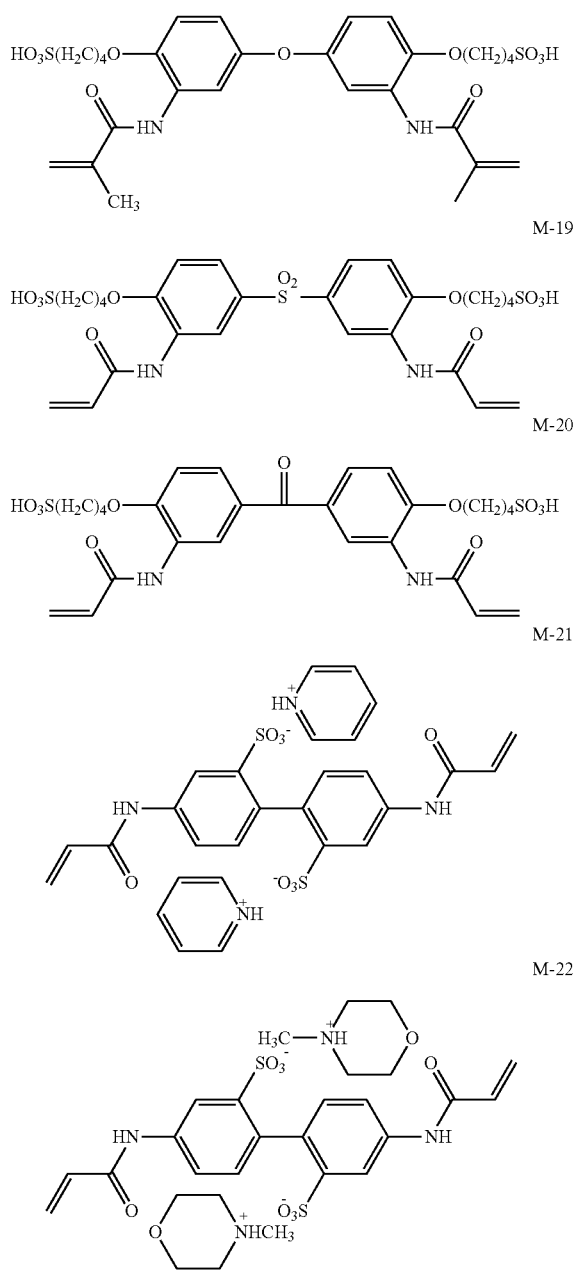

The content of the polymerizable compound represented by Formula (II) is preferably 1% to 95% by mass, more preferably 10% to 60% by mass, and even more preferably 15% to 30% by mass, with respect to the total mass of the solids content of the composition for forming a functional polymer membrane.

When the content is in the preferred range, the desired curability and excellent pH resistance, mechanical strength, and flexibility are obtained.

(B) Other Monofunctional Polymerizable Compounds

According to the invention, the polymer having a structure represented by Formula (I) may be a copolymer of the polymerizable compound represented by Formula (II) of the component (A) and another monofunctional polymerizable compound of the component (B).

Here, the other monofunctional polymerizable compound of the component (B) serves to regulate the hydrophobicity, hydrophilicity and crosslinking density of the membrane in order to regulate the water permeability of the functional polymer membrane of the invention or the electrical resistance of the membrane.

The "other monofunctional polymerizable compound" refers to a monofunctional polymerizable compound having a chemical structure that is different from that of the polymerizable compound, particularly a monofunctional polymerizable compound, represented by Formula (II).

Examples of such other monofunctional polymerizable compounds include known monomers such as acrylic acid esters, methacrylic acid esters, acrylamides, methacrylamides, vinyl esters, styrenes, acrylic acid, methacrylic acid, acrylonitrile, maleic anhydride, and maleic acid imide. When these monomers are copolymerized, various physical properties such as film-forming properties, membrane strength, hydrophilicity, hydrophobicity, solubility, reactivity and stability can be improved. Regarding the method for synthesizing the monomers, for example, reference can be made to items such as ester synthesis in "Lectures on Experimental Science, 5$^{th}$ Edition, Vol. 16, Synthesis of Organic Compounds (II-1)", edited by Maruzen Co., Ltd., or items such as handling and purification of monomers in "Lectures on Experimental Science, 5$^{th}$ Edition, Vol. 26, Polymer Chemistry".

Among these, in view of stability and pH resistance of the functional polymer membrane thus obtained, a compound that does not have an ester bond, a (meth)acrylamide compound, a vinyl ether compound, an aromatic vinyl compound, an N-vinyl compound (a polymerizable monomer having an amide bond), and an allyl compound are preferred, and a (meth)acryl amide compound is particularly preferred.

Examples of other monofunctional polymerizable compounds include the compounds described in JP2008-208190A and JP2008-266561A. These monofunctional polymerizable compounds preferably have a dissociable group, as will be described below, so as to impart functions to the polymer membrane.

For example, regarding a (meth)acrylate compound, one having a substituent (preferred examples of the substituent include the substituents described below) in the alcohol moiety of the ester, and particularly one having a dissociable group in the alkyl moiety of the alcohol, is also preferred.

In regard to the production of the functional polymer membrane of the invention, when a monofunctional polymerizable compound having a (meth)acrylamide structure is used as another monofunctional polymerizable compound, it is preferable that the polymer included in this functional polymer membrane has a structure represented by the following Formula (V):

Formula (V)

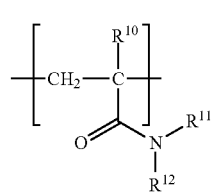

wherein in Formula (V), $R^{10}$ represents a hydrogen atom or methyl; $R^{11}$ represents a hydrogen atom or a substituted or unsubstituted alkyl group; $R^{12}$ represents a substituted or unsubstituted alkyl group; and $R^{11}$ and $R^{12}$ may be bonded to each other and form a ring.

$R^{10}$ is preferably a hydrogen atom.

The number of carbon atoms of the alkyl group for $R^{11}$ and $R^{12}$ is preferably 1 to 18, more preferably 1 to 12, and particularly preferably 1 to 6. Examples thereof include methyl, ethyl, n-propyl, isopropyl, n-butyl, t-butyl, n-pentyl, n-hexyl, 2-ethylhexyl, n-octyl, t-octyl, n-decyl, and n-octadecyl.

These alkyl groups are preferably linear or branched alkyl groups, and such an alkyl group may have a substituent.

Examples of the substituent for the alkyl group include a hydroxyl group, a sulfo group or a salt thereof, a carboxyl group or a salt thereof, an onio group (ammonia, pyridinio, sulfonio or the like), a halogen atom, an alkyl group, an aryl group, a heterocyclic group, an alkoxy group, an aryloxy group, an alkylthio group, an arylthio group, an amino group (including an amino group, an alkylamino group, an arylamino group, and a heterocyclic amino group), an amide group, a sulfonamide group, a carbamoyl group, a sulfamoyl group, an acyl group, and a cyano group.

According to the invention, particularly in order to impart functions to the polymer membrane, it is also preferable that the functions are imparted by means of the substituent of this alkyl group. Therefore, among the substituents described above, a dissociable group and a polar substituent are preferred, and a dissociable group is particularly preferred.

The dissociable group is preferably a hydroxyl group (particularly, a phenolic or enolic hydroxyl group), a sulfo group or a salt thereof, a carboxyl group or a salt thereof, or a phosphoric acid group or a salt thereof, as described above; and more preferably a sulfo group or a salt thereof.

Here, preferred examples of the counter cation for the sulfo group or carboxyl group include an organic base ion such as N-methylmorpholinyl or pyridinium, or a cation of an alkali metal atom, for example, a lithium cation, a potassium cation, or a sodium cation.

The polymer included in the functional polymer membrane of the invention is preferably a copolymer of the polymer having a structure represented by Formula (III) and the polymer having a structure represented by Formula (V), and the composition ratio is preferably 10:90 to 100:0, more preferably 20:80 to 90:10, and even more preferably 30:70 to 80:20, as a molar ratio per unit structure.

A functional polymer membrane which includes the polymer containing a structure represented by Formula (V) is preferably produced by subjecting a composition for forming a functional polymer membrane including a monofunctional polymerizable compound represented by the following Formula (VI), to a polymerization curing reaction:

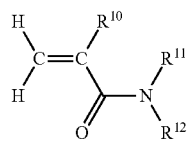

Formula (VI)

wherein in Formula (VI), $R^{10}$, $R^{11}$, and $R^{12}$ have the same meanings as $R^{10}$, $R^{11}$, and $R^{12}$ in the above Formula (V), respectively, and preferred ranges thereof are also the same.

Next, specific preferred examples of the polymerizable compound represented by Formula (VI) are listed below; however, the invention is not intended to be limited to these.

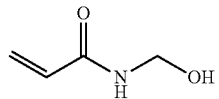
(VI-1)

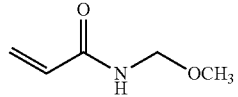
(VI-2)

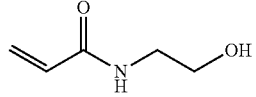
(VI-3)

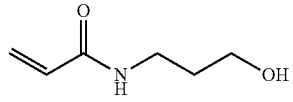
(VI-4)

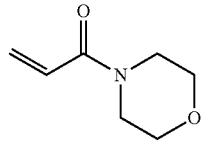
(VI-5)

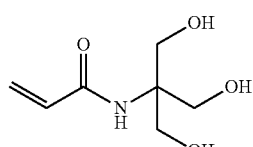
(VI-6)

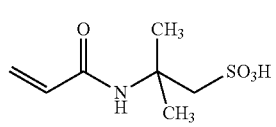
(VI-7)

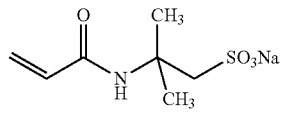
(VI-8)

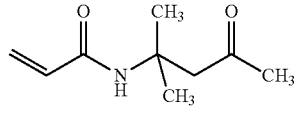
(VI-9)

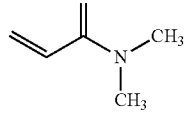
(VI-10)

These compounds are commercially available from Kohjin Co., Ltd., Kyowa Hakko Chemical Co., Ltd., Fluka Chemicals, Ltd., Sigma-Aldrich Co., and Toagosei Co., Ltd., or can be easily synthesized by known methods.

Furthermore, the functional polymer membrane of the invention can also be produced by combining the polymerizable compound represented by Formula (II) and a polyfunctional polymerizable compound with bifunctionality or higher functionality, which does not have a dissociable group. Specific preferred examples of the polyfunctional polymerizable compound with bifunctionality or higher functionality, which does not have a dissociable group, are listed below; however, the invention is not intended to be limited to these.

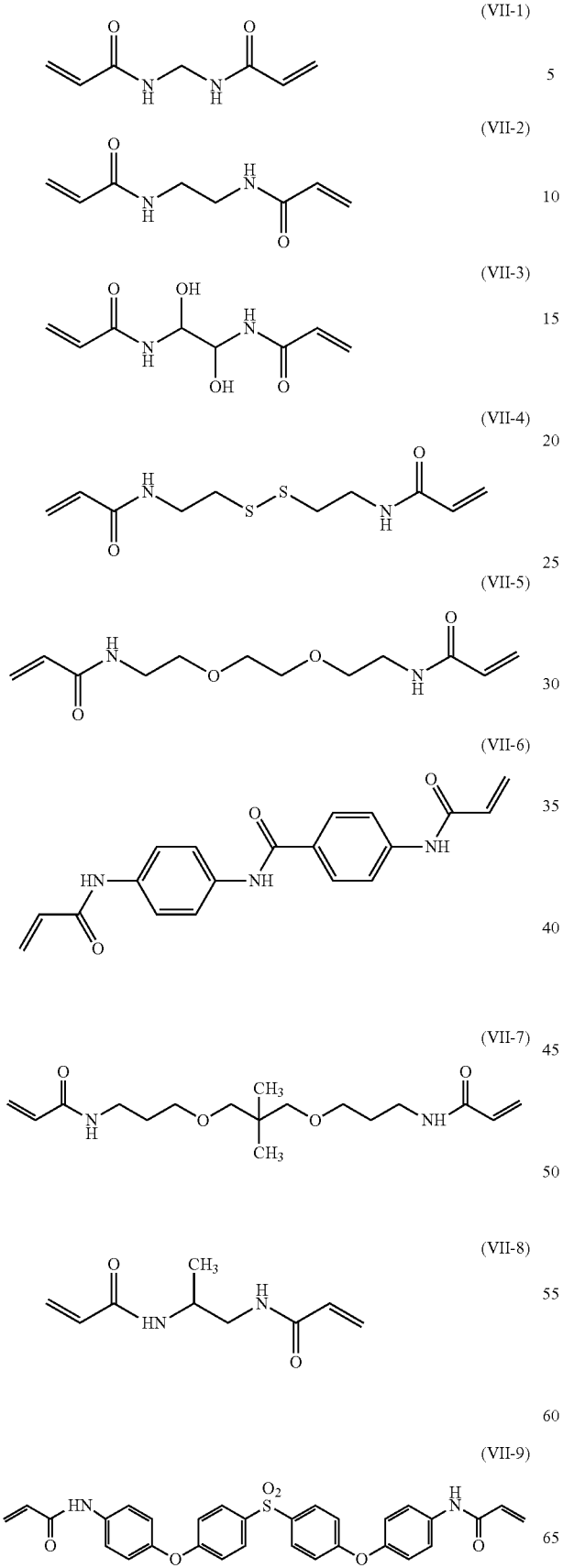

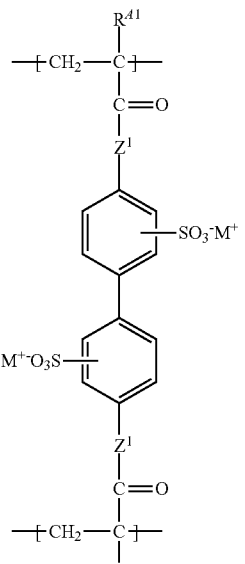

Here, 1 in compound (VII-10) represents an integer of 1 or more.

According to the invention, the polymer containing a structure represented by Formula (I) is preferably a polymer containing a structure represented by the following Formula (P1).

Formula (P1)

[A]

wherein in Formula (P1), $R^{41}$ has the same meaning as $R^1$ in the above Formula (I), and a preferred range thereof is also the same; $Z^1$ represents —O— or —NRa-, wherein Ra represents a hydrogen atom or an alkyl group; and $M^+$ represents a hydrogen ion or an alkali metal ion.

$Z^1$ represents —O— or —NRa-.

Here, Ra represents a hydrogen atom or an alkyl group, while the alkyl group is a linear or branched alkyl group which preferably has 1 to 10 carbon atoms, more preferably 1 to 5 carbon atoms, and particularly preferably 1 to 3 carbon atoms. Specific examples of the alkyl group include methyl, ethyl, isopropyl, t-butyl, n-octyl, 2-ethylhexyl, n-decyl, and n-hexadecyl.

Ra is preferably a hydrogen atom, a methyl group, or an ethyl group, and more preferably a hydrogen atom.

$Z^1$ is preferably —NRa-, among others.

$M^+$ represents a hydrogen ion or an alkali metal ion. Preferred examples of the alkali metal ion include a lithium ion, a potassium ion, and a sodium ion.

$M^+$ is preferably a hydrogen ion, a lithium ion, a potassium ion, or a sodium ion; more preferably a hydrogen ion or a sodium ion; and even more preferably a sodium ion.

Within the preferred ranges described above, excellent curability, pH resistance, mechanical strength, and flexibility are obtained as desired.

According to the invention, the polymerizable compound represented by Formula (II) is preferably a compound represented by the following Formula (MA). The polymer having a structure represented by Formula (P1) is obtained by subjecting a compound represented by the following Formula (MA) to a polymerization reaction, that is, a curing reaction.

The compound represented by Formula (MA) is explained below.

(A) Compound represented by Formula (MA)

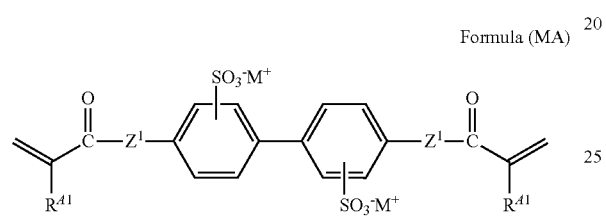

Formula (MA)

wherein in Formula (MA), $R^{A1}$, $Z^1$ and $M^+$ have the same meanings as $R^{A1}$, $Z^1$ and $M^-$ in Formula (P1), respectively, and preferred ranges thereof are also the same.

Specific examples of the compound represented by Formula (MA) are listed below; however, the invention is not intended to be limited to these.

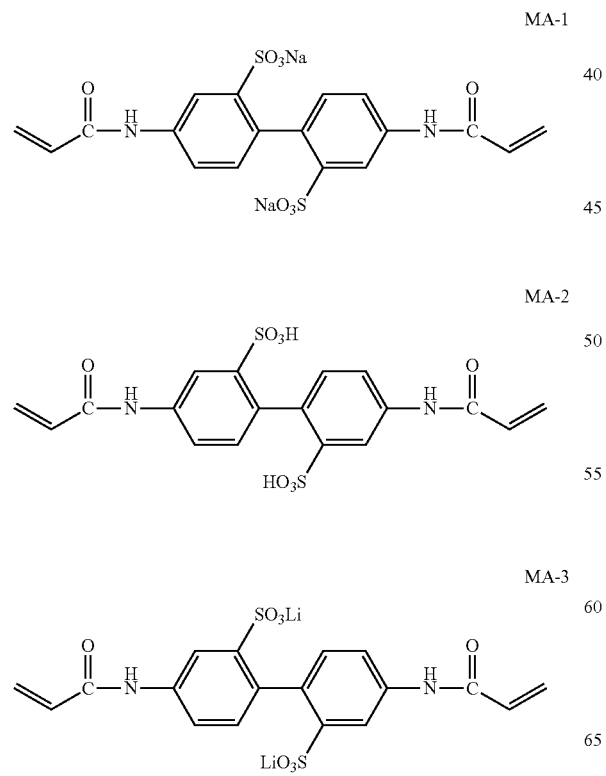

MA-1

MA-2

MA-3

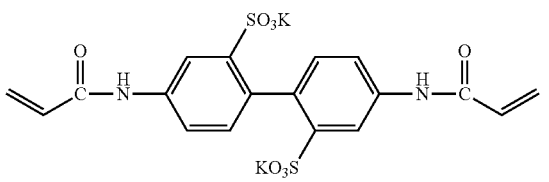

MA-4

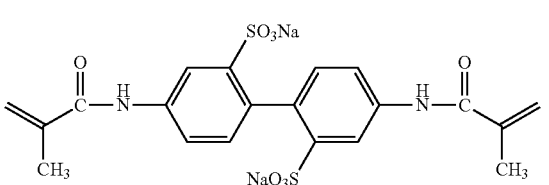

MA-5

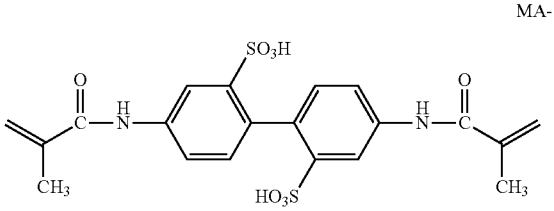

MA-6

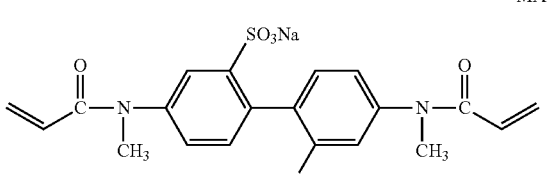

MA-7

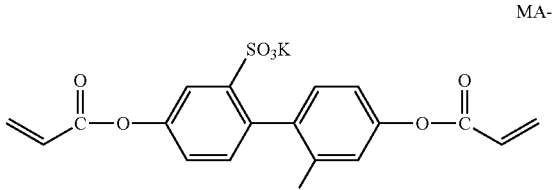

MA-8

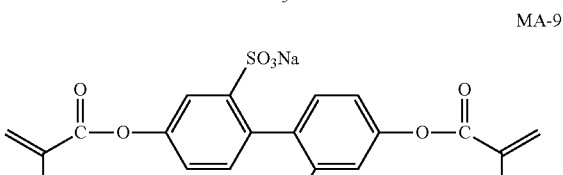

MA-9

These compounds can be synthesized by the methods disclosed in the Examples described below, or methods equivalent to these.

The (A) polymer having a structure represented by Formula (P1) may be a repetition of the structure represented by Formula (P1) only, or may be a copolymer with (B) another copolymerizable monomer.

According to the invention, a polymer having a structure in which a structure obtainable from another copolymerizable monomer is incorporated, is preferred.

Here, the (B) other copolymerizable monomer contributes to the regulation of the balance between the coefficient of water permeability of the functional polymer membrane of the invention and the electrical resistance of the membrane, or to the effects of the adjustment of the coating liquid viscosity, adjustment of stability over time of the coating liquid, or the like.

Such a monomer may be any arbitrary monomer. The monomer may be a monofunctional polymerizable compound, or may be a polyfunctional polymerizable compound having a structure different from that of the polyfunctional polymerizable compound represented by Formula (MA) described above.

According to the invention, the (B) other copolymerizable monomer is preferably a monofunctional polymerizable compound represented by Formula (MB) described below.

A polymer having a structure represented by the following Formula (CP1), which is obtained by copolymerizing the monofunctional polymerizable compound represented by Formula (MB) and the compound represented by Formula (MA), is preferred.

Formula (CP1)

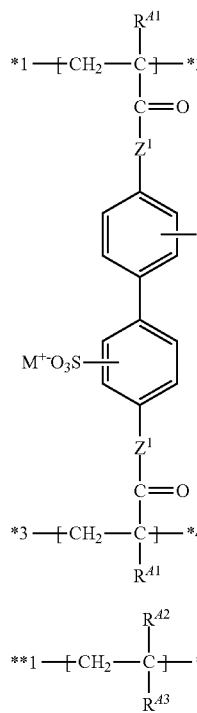

wherein in Formula (CP1), $R^{41}$, $Z^1$ and $M^+$ have the same meanings as $R^{41}$, $Z^1$ and $M^-$ in the above Formula (P1), respectively; $R^{42}$ represents a hydrogen atom or an alkyl group; and $R^{43}$ represents an organic group that has no ethylenically unsaturated group. Here, any one of *1 to *4 of at least one partial structure [A] is bonded to 1 or 2 of at least the partial structure [B]. Meanwhile, in Formula (CP1), there may be a part in which the partial structures [A] are bonded to each other, or there may be a part in which the partial structures [B] are bonded to each other.

Here, the partial structure [A] is a structure obtainable from Formula (MA), and the partial structure [B] is a structure obtainable from Formula (MB).

As these structures are subjected to a polymerization curing reaction, any one of *1 to *4 of the partial structure [A] is bonded to 1 or 2 of the partial structure [B].

There are no particular limitations on the mode of bonding, and for example, the partial structures [A] and [B] may be linked in a block form, or may be linked randomly.

(B) Other Copolymerizable Monomer

Formula (MB)

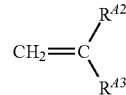

In Formula (MB), $R^{42}$ represents a hydrogen atom or an alkyl group.

$R^{42}$ has the same meaning as $R^{41}$ in Formula (MA), and a preferred range thereof is also the same.

R an organic group that has no ethylenically unsaturated group.

Here, the ethylenically unsaturated group is a group capable of undergoing a polymerization curing reaction, such as a vinyl group, an allyl group, or a (meth)acryloyl group, and this means that the compound represented by Formula (MB) is a monofunctional polymerizable compound. Furthermore, the organic group is an organic group such as an alkyl group, a cycloalkyl group, an aryl group, or a heterocyclic group, and for example, this organic group is not substituted with an ethylenically unsaturated group as a substituent.

Examples of $R^{43}$ an alkyl group, an aryl group, an alkoxy group, an aryloxy group, an alkylthio group, an arylthio group, an alkylamino group, an arylamino group, an acyl group, an acyloxy group, and an acylamino group. An acyloxy group and an acylamino group are preferred.

The monofunctional polymerizable compound represented by Formula (MB) is preferably a compound represented by the following Formula (MB-α):

Formula (MB-α)

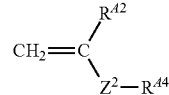

wherein in Formula (MB-α), $R^{42}$ has the same meaning as $R^{42}$ in Formula (MB), and a preferred range thereof is also the same. $R^{44}$ has the same meaning as $R^{43}$ in Formula (MB), and a preferred range thereof is also the same.

$Z^2$ has the same meaning as $Z^1$ in Formula (P1), and a preferred range thereof is also the same. Among others, $Z^2$ is preferably —NRa-, and —NH— is more preferred.

According to the invention, particularly in order to impart the functions of a polymer membrane, it is also preferable that functions are imparted by means of a substituent of the alkyl group for $R^{42}$ to $R^{44}$. Therefore, among the substituents described above, a dissociable group or a polar substituent is preferred, and a dissociable group is particularly preferred.

The dissociable group is preferably a hydroxyl group (particularly a phenolic or enolic hydroxyl group), a sulfo group or a salt thereof, a carboxyl group or a salt thereof, or a phosphoric acid group or a salt thereof as described above, and a sulfo group or a salt thereof is more preferred.

Here, regarding the salt for the sulfo group or the carboxyl group, a cation of an alkali metal atom, for example, a lithium cation, a potassium cation, or a sodium cation is preferred.

The compound represented by Formula (MB-α) is preferably a compound represented by the following Formula (MB-β):

Formula (MB-β)

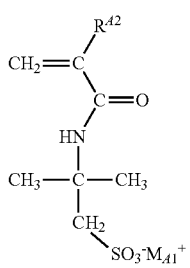

wherein in Formula (MB-β), $R^{42}$ has the same meaning as $R^{42}$ in the above Formula (MB-α), and a preferred range thereof is also the same; and $M_{A1}^{+}$ represents a hydrogen atom or an alkali metal ion, and has the same preferred range as that of $M^{+}$ in Formula (P1).

The structure obtainable from the compounds represented by Formulas (MB-α) and (MB-β) (structure incorporated into the polymer) has the following structure.

Here, the following partial structure [B-1] is obtainable from a compound represented by Formula (MB-α), and the following partial structure [B-2] is obtainable from a compound represented by Formula (MB-β).

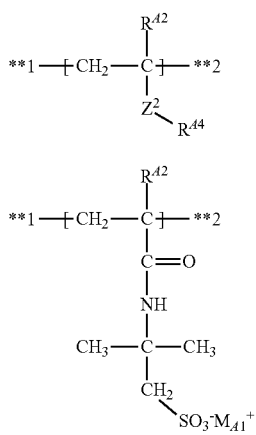

wherein in the partial structures [B-1] and [B-2], $R^{42}$, 1 and 2 have the same meanings as $R^{42}$, 1 and 2 in the partial structure [B], respectively; $M_{A1}$ represents a hydrogen atom or an alkali metal ion; $Z^2$ and $R^{44}$ have the same meanings as $Z^2$ and $R^{44}$ in Formula (MB-α), respectively, and preferred ranges thereof are also the same.

Specific examples of the monofunctional polymerizable compound represented by Formula (MB) are listed below; however, the invention is not intended to be limited to these.

(MB-1)

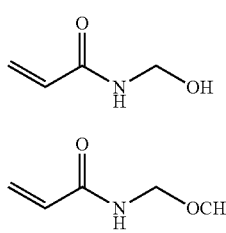

(MB-2)

(MB-3)
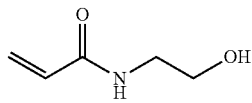

(MB-4)
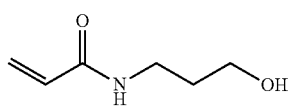

(MB-5)
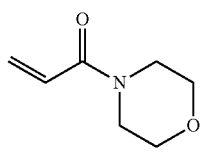

(MB-6)
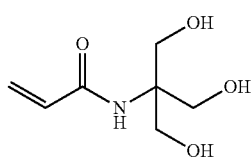

(MB-7)
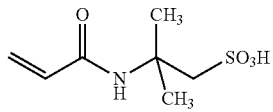

(MB-8)
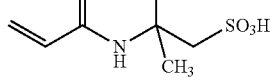

(MB-9)
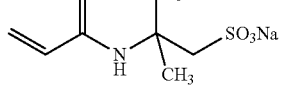

(MB-10)
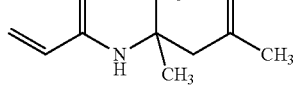

These compounds are commercially available from Kohjin Co., Ltd., Kyowa Hakko Chemical Co., Ltd., Fluka Chemicals, Ltd., Sigma-Aldrich Co., and Toagosei Co., Ltd., or can be easily synthesized by known methods.

In regard to the functional polymer membrane of the invention, the composition ratio of the partial structure [A] to the partial structure [B] in Formula (CP1) is determined by the molar ratio of the polymerizable compounds in the composition for obtaining a functional membrane.

In such a composition, the compound represented by Formula (MA) is included preferably in an amount of 28 moles or more, more preferably in an amount of 28 to 95 moles, and even more preferably in an amount of 30 to 90 moles, when the total mole number of the polymerizable compounds included in the composition is designated as 100, that is, designated as 100 moles. Furthermore, it is preferable that the remaining polymerizable compound is a compound represented by the above-described Formula (MB).

There is a correlation between the coefficient of water permeability and the membrane resistance, and the functional polymer membrane of the invention can have the coefficient of water permeability, the membrane resistance, and the burst strength regulated by appropriately setting the molar ratio of the partial structure [A] to the partial structure [B] in Formula (CP1).

(C) Polymerization Initiator

The composition for forming a functional polymer membrane according to the invention preferably includes a polymerization initiator.

Among polymerization initiators, a photopolymerization initiator which is capable of performing polymerization by irradiation of active radiation is preferred in this invention.

Examples of the photopolymerization initiator include aromatic ketones, an acylphosphine compound, an aromatic onium salt compound, an organified oxide, a thio compound, a hexaarylbiimidazole compound, a keto oxime ester compound, a borate compound, an azinium compound, a metallocene compound, an active ester compound, a compound having a carbon-halogen bond, and an alkylamine compound.

Preferred examples of the aromatic ketones, acylphosphine oxide compound, and thio compound include the compounds having a benzophenone skeleton or a thioxanthone skeleton as described in "Radiation Curing in Polymer Science and Technology", p. 77-117 (1993). More preferred examples thereof include the α-thiobenzophenone compound described in JP1972-006416B (JP-S47-006416B); the benzoin ether compound described in JP1972-003981B (JP-S47-003981B); the α-substituted benzoin compound described in JP1972-022326B (JP-S47-022326B); the benzoin derivative described in JP1972-023664B (JP-S47-023664B); the aroylphosphonic acid ester described in JP1982-030704A (JP-S57-030704A); the dialkoxybenzophenone described in JP1985-026483B (JP-S60-026483B); the benzoin ethers described in JP1985-026403B (JP-S60-026403B) and JP1987-081345A (JP-562-081345A); the α-aminobenzophenones described in JP1989-034242B (JP-H01-034242B), US4318791A, and EP0284561A; p-di(dimethylaminobenzoyl)benzene described in JP1990-211452A (JP-H02-211452A); the thio-substituted aromatic ketones described in JP1986-194062A (JP-561-194062A); the acylphosphine sulfides described in JP1990-009597B (JP-H02-009597B); the acylphosphines described in JP1990-009596B (JP-H02-009596B); the thioxanthones described in JP1988-061950B (JP-S63-061950B); and the coumarins described in JP1984-042864B (JP-559-042864B). Furthermore, the polymerization initiators described in JP2008-105379A and JP2009-114290A are also preferred. Further examples include the polymerization initiators described in Kiyoshi Kato, "Shigaisen Koka Shisutemu (UV Curing System)" (published by Sogo Gijutsu Senta Co., Ltd.; 1989), pp. 65-148.

According to the invention, a water-soluble polymerization initiator is preferred.

Here, when it is said that a polymerization initiator is water-soluble, this implies that the polymerization initiator dissolves in distilled water at 25° C. in an amount of 0.5% by mass or more. It is more preferable that the water-soluble photopolymerization initiator dissolves in distilled water at 25° C. in an amount of 1% by mass or more, and particularly preferably in an amount of 3% by mass or more.

Among these, a photopolymerization initiator suitable for the composition for forming a functional polymer membrane according to the invention is aromatic ketones (particularly, an α-hydroxy-substituted benzoin compound) or an acylphosphine oxide compound. Particularly, preferred examples include p-phenylbenzophenone (manufactured by Wako Pure Chemical Industries, Ltd.), bis(2,4,6-trimethylbenzoyl)phenylphosphine oxide (IRGACURE 819, manufactured by BASF Japan, Ltd.), 2,4,6-trimethylbenzoyldiphenylphosphine oxide (DAROCUR TPO, manufactured by BASF Japan, Ltd.), 2-benzyl-2-dimethylamino-1-(4-morpholinophenyl)-butanone-1 (IRGACURE 369, manufactured by BASF Japan, Ltd.), 2-methyl-1-(4-methylthiophenyl)-2-morpholinopropan-1-one (IRGACURE 907, manufactured by BASF Japan, Ltd.), 1-[4-(2-hydroxyethoxy)phenyl]-2-hydroxy-2-methyl-1-propan-1-one (IRGACURE 2959, manufactured by BASF Japan, Ltd.), and 2-hydroxy-2-methyl-1-phenyl-propan-1-one (DAROCUR 1173, manufactured by Ciba Specialty Chemicals Corp.), and from the viewpoints of water-solubility and resistance to hydrolysis, IRGACURE 2959 (manufactured by BASF Japan, Ltd.) and DAROCUR 1173 (manufactured by Ciba Specialty Chemicals Corp.) are most preferred.

According to the invention, the content of the polymerization initiator is preferably 0.1 to 10 parts by mass, more preferably 0.1 to 5 parts by mass, and even more preferably 0.3 to 2 parts by mass, with respect to 100 parts by mass of the total solids content mass of the composition for forming a functional polymer membrane.

(D) Co-Sensitizer

Furthermore, in regard to the production process for the functional polymer membrane of the invention, a known compound having an effect of further increasing sensitivity or suppressing the polymerization inhibition caused by oxygen, may be added as a co-sensitizer.

Examples of such a co-sensitizer include amines, for example, those compounds described in M. R. Sander, et al., "Journal of Polymer Society", Vol. 10, p. 3173 (1972); JP1969-020189B (JP-S44-020189B), JP1976-082102A (JP-S51-082102A), JP1977-134692A (JP-S52-134692A), JP1984-138205A (JP-S59-138205A), JP1985-084305A (JP-S60-084305A), JP1987-018537A (JP-S62-018537A), JP1989-033104A (JP-S64-033104A); and Research Disclosure, No. 33825. Specific examples include triethanolamine, p-dimethylaminobenzoic acid ethyl ester, p-formyldimethylaniline, and p-methylthiodimethylaniline.

Other examples thereof include thiols and sulfides, for example, the thiol compounds described in JP1978-000702A (JP-S53-000702A), JP1980-500806B (JP-S55-500806B), and JP1993-142772A (JP-H05-142772A); and the disulfide compounds described in JP1981-075643A (JP-S56-075643A). Specific examples thereof include 2-mercaptobenzothiazole, 2-mercaptobenzoxazole, 2-mercaptobenzimidazole, 2-mercapto-4(3H)-quinazoline, and β-mercaptonaphthalene.

Still other examples include amino acid compounds (for example, N-phenylglycine), the organometallic compounds described in JP1973-042965B (JP-S48-042965B) (for example, tributyltin acetate), the hydrogen donors described in JP1980-034414B (JP-555-034414B), the sulfur compounds described in JP1994-308727A (JP-H06-308727A) (for example, trithian), the phosphorus compounds described in JP1994-250387A (JP-H06-250387A) (diethyl phosphite and the like), and the Si—H and Ge-H compounds described in JP1996-065779A (JP-H08-065779A).

(E) Polymerization Inhibitor

According to the invention, it is also preferable to incorporate a polymerization inhibitor in order to impart stability to the coating liquid.

Regarding the polymerization inhibitor, any known polymerization inhibitor can be used, and examples thereof include a phenol compound, a hydroquinone compound, an amine compound, and a mercapto compound.

Specific examples of the phenol compound include hindered phenol (a phenol having a t-butyl group at the ortho-position, and a representative example is 2,6-di-t-butyl-4-methylphenol), and bisphenols. Specific examples of the hydroquinone compound include monomethyl ether hydroquinone.

These polymerization inhibitors may be used singly or in combination of two or more kinds thereof.

The content of the polymerization inhibitor is preferably 0.01 to 5 parts by mass, more preferably 0.01 to 1 part by mass, and even more preferably 0.01 to 0.5 parts by mass, with respect to 100 parts by mass of the total solids content mass of the composition for forming a functional polymer membrane.

(F) Solvent

The composition for forming a functional polymer membrane according to the invention may include a solvent. The content of the (F) solvent in the composition for forming a functional polymer membrane is preferably 5% to 50% by mass, more preferably 10% to 50% by mass, and even more preferably 10% to 40% by mass, with respect to the total amount of the composition for forming a functional polymer membrane.

When the composition includes a solvent, the polymerization curing reaction proceeds uniformly and smoothly. Furthermore, when a porous support is impregnated with the composition for forming a functional polymer membrane, impregnation proceeds smoothly.

Regarding the solvent, a solvent having a solubility in water of 5% by mass or more is preferably used, and it is also preferable that the solvent is freely miscible with water. Therefore, a solvent selected from water and a water-soluble solvent is preferred.

Particularly preferred examples of the water-soluble solvent include an alcohol-based solvent, and aprotic polar solvents such as an ether-based solvent, an amide-based solvent, a ketone-based solvent, a sulfoxide-based solvent, a sulfone-based solvent, a nitrile-based solvent, and an organic phosphorus-based solvent.

Examples of the alcohol-based solvent include methanol, ethanol, isopropanol, n-butanol, ethylene glycol, propylene glycol, diethylene glycol, and dipropylene glycol. These can be used singly or in combination of two or more kinds thereof.

Furthermore, preferred examples of the aprotic polar solvent include dimethyl sulfoxide, dimethylimidazolidinone, sulfolane, N-methylpyrrolidone, dimethylformamide, acetonitrile, acetone, dioxane, tetramethylurea, hexamethylphosphoramide, hexamethylphosphorous triamide, pyridine, propionitrile, butanone, cyclohexanone, tetrahydrofuran, tetrahydropyran, ethylene glycol diacetate, and γ-butyrolactone. Among these, dimethyl sulfoxide, N-methylpyrrolidone, dimethylformamide, dimethylimidazolidinone, sulfolane, acetone, acetonitrile, and tetrahydrofuran are preferred. These can be used singly or in combination of two or more kinds thereof.

(G) Alkali Metal Compound

The composition for forming a functional polymer membrane according to the invention may include an alkali metal compound in order to enhance solubility of the polymerizable compound represented by Formula (II), which has a (meth)acrylamide structure. Preferred examples of the alkali metal compound include hydroxides, chlorides, nitrates and the like of lithium, sodium and potassium. Among them, lithium compounds are more preferred, and specific examples thereof include lithium hydroxide, lithium chloride, lithium bromide, lithium nitrate, lithium iodide, lithium chlorate, lithium thiocyanate, lithium perchlorate, lithium tetrafluoroborate, lithium hexafluorophosphate, and lithium hexafluoroacetonate.

Here, it is also preferable to use the alkali metal compound in order to neutralize the composition for forming a functional polymer membrane, or a solution mixture of the composition for forming a functional polymer membrane.

These alkali metal compounds may also be in the form of hydrates. Also, the alkali metal compounds can be used singly or in combination of two or more kinds thereof.

The amount of addition in the case of adding an alkali metal compound is preferably 0.1 to 20 parts by mass, more preferably 1 to 20 parts by mass, and even more preferably 5 to 20 parts by mass, with respect to 100 parts by mass of the total solids content mass of the composition for forming a functional polymer membrane.

The functional polymer membrane of the invention has sulfonic acid groups ($SO_3^-$), and thus can also be used as an electrolyte membrane (ion exchange membrane). The functional polymer membrane can exchange cation $Na^+$ in water containing a salt such as NaCl.

According to the invention, particularly when the polymerizable compound having a phenylacrylamide structure represented by Formula (H) is bifunctional or higher-functional, the polymerizable compound has an acrylamide crosslinkable group and thus has UV-curability, and therefore, a crosslinkable functional polymer membrane is obtained in a short time. Thus, an electrolyte membrane can be produced at low cost with excellent productivity.

An ideal ion exchange membrane has low membrane resistance, a low coefficient of water permeability, and high permselectivity (selectivity on cation/anion exchange and separation). As the charge density per unit structure molecular weight is higher, the membrane resistance is generally lower, and permselectivity is higher. When the crosslinking density is increased, the coefficient of water permeability can be decreased.

According to the invention, it was found that if a crosslinkable polymerizable compound (bifunctional or higher-functional acrylamide) has a large number of dissociable groups (sulfonic acid groups), a functional polymer membrane having low membrane resistance, low coefficient of water permeability, and high permselectivity is obtained.

Furthermore, it is believed that as in the case of the exemplary polymerizable compounds M-11 to M-22, if the crosslinkable polymerizable compound has two phenylacrylamide structural units that are rigid and hydrophobic, the crosslinkable polymerizable compound contributes to the decrease of the coefficient of water permeability.

[Other Components]

In the functional polymer membrane of the invention, various polymer compounds can be added in order to regulate the membrane properties. Examples of the polymer compounds that can be used include an acrylic polymer, a polyurethane resin, a polyamide resin, a polyester resin, an epoxy resin, a phenolic resin, a polycarbonate resin, a polyvinyl butyral resin, a polyvinyl formal resin, shellac, a vinyl-based resin, an acrylic resin, a rubber-based resin, a wax, and other natural resins. Also, these may be used in combination of two or more kinds thereof.

Furthermore, a nonionic surfactant, a cationic surfactant, an organofluorine compound, and the like can also be added for the purpose of regulating the liquid properties.

Specific examples of the surfactant include anionic surfactants such as an alkylbenzenesulfonic acid salt, an alkylnaphthalenesulfonic acid salt, a higher fatty acid salt, a sulfonic acid salt of a higher fatty acid ester, a sulfuric acid ester salt of a higher alcohol ether, a sulfonic acid salt of a higher alcohol ether, an alkylcarboxylic acid salt of a higher alkylsulfonamide, and an alkyl phosphate; nonionic surfactants such as polyoxyethylene alkyl ether, polyoxyethylene alkyl phenyl ether, polyoxyethylene fatty acid ester, sorbitan fatty acid ester, an ethylene oxide adduct of acetylene glycol, an ethylene oxide adduct of glycerin, and polyoxyethylene sorbitan fatty acid ester; amphoteric surfactants such as an alkylbetaine and an amidobetaine; silicone-based surfactants; and fluorine-based surfactants. The surfactant can be appropriately selected from conventionally known surfactants and derivatives thereof.

Specific examples of a polymeric dispersant include polyvinylpyrrolidone, polyvinyl alcohol, polyvinyl methyl ether, polyethylene oxide, polyethylene glycol, polypropylene glycol, and polyacrylamide, and among these, it is preferable to use polyvinylpyrrolidone.

In addition to the alkali metal compound described above, the composition for forming a functional polymer membrane may also include, for example, a surfactant, a viscosity increasing agent, a surface tension adjusting agent, and a preservative, as necessary.

<Support>

In order to provide a membrane with high mechanical strength, numerous technologies can be utilized. For example, a support can be used as a reinforcing material for the membrane, and preferably, a porous support can be used. This porous support can be used to constitute a part of the membrane by impregnating the porous support with the composition for forming a functional polymer membrane, and then performing a polymerization curing reaction.

Examples of the porous support as a reinforcing material include a synthetic woven fabric or a synthetic nonwoven fabric, a spongy film, a film having fine through-holes, and paper. Examples of the material that forms the porous support of the invention include polyethylene, polypropylene, polyacrylonitrile, polyvinyl chloride, polyester, polyamide, and copolymers thereof. Also, porous membranes based on polysulfone, polyether sulfone, polyphenylene sulfone, polyphenylene sulfide, polyimide, polyethermide, polyamide, polyamideimide, polyacrylonitrile, polycarbonate, polyacrylate, cellulose acetate, polypropylene, poly(4-methyl-1-pentene), polyvinylidene fluoride, polytetrafluoroethylene, polyhexafluoropropylene, polychlorotrifluoroethylene, and copolymers thereof, or biomass materials such as cellulose, may also be used. Commercially available porous supports and reinforcing materials are marketed by, for example, Freudenberg Filtration Technologies KG (Novatexx materials) and Sefar AG.

Meanwhile, in a case in which a photopolymerization curing reaction is carried out, the porous support and the reinforcing material are required not to block the wavelength region of irradiated light, that is, required to transmit radiation of the wavelength used for the polymerization and curing; however, in the case of thermal polymerization and curing, this does not need to be considered. Furthermore, it is preferable that the porous reinforcing material allows penetration of the composition for forming a functional polymer membrane.

The support is preferably hydrophilic. Surprisingly, an ion exchange membrane having a weakly basic or weakly acidic group (for example, tertiary amino, carboxyl and phosphate groups) can exhibit satisfactory properties in connection with permselectivity and electrical conductivity, and production of the membrane by the present method is not excessively expensive.

[Method for Producing Functional Polymer Membrane]

It is desirable that the functional polymer membrane of the invention is formed by applying a coating liquid containing the polymerizable compound represented by Formula (II) as a monomer on the support described above, and subjecting the coating liquid to a crosslinking reaction by irradiating the coated support with active radiation, or by applying heat to the support.

As an example of the method for producing the functional polymer membrane of the invention, a method of applying a coating liquid containing the polymerizable compound represented by Formula (II) on a support, and forming the functional polymer membrane by irradiating the coated support with active radiation, may be used. The ingredient composition of the coating liquid (dope) that is applied on the support is not particularly limited; however, it is preferable that the coating liquid includes the polymerizable compound represented by Formula (II) and a polymerization initiator in a solvent. The content of the polymerizable compound represented by Formula (II) is not particularly limited; however, the polymerizable compound is preferably included in the coating liquid in an amount of 0.1% to 100% by mass, and more preferably 10% to 100% by mass, with respect to 100% by mass of the total solids content mass of the coating liquid. While the content of the polymerizable compound is set to this range, when a membrane is produced on a porous support, the polymerizable compound does not easily penetrate into lower layers. Therefore, defects are not generated in the surface layer that contributes to separation.

There are no particular limitations on the conditions for forming the functional polymer membrane of the invention; however, the temperature is preferably −30° C. to 100° C., more preferably −10° C. to 80° C., and particularly preferably 5° C. to 60° C.

According to the invention, gas such as air or oxygen may be allowed to co-exist at the time of forming the membrane; however, it is preferable that the membrane is formed in an inert gas atmosphere.

The functional polymer membrane of the invention can be produced batchwise (batch system) using a fixed support; however, the membrane can also be produced continuously (continuous system) using a moving support. The support may be in the form of a roll that is continuously rewound. Meanwhile, in the case of a continuous system, the processes of mounting a support on a continuously moving belt, and forming a membrane by subjecting a coating liquid, which is the composition for forming a functional polymer membrane, to continuous application and polymerization curing, can be continuously carried out. However, only one of the coating step and the membrane forming step may be continuously carried out.

Meanwhile, apart from the support, a provisional support may be used until the support is immersed in the composition for forming a functional polymer membrane, and the polymerization curing reaction is completed (after completion of the polymerization curing reaction, the membrane is peeled off from the provisional support).

Regarding such a provisional support, it is not necessary to consider mass transfer, and a provisional support includes, for example, a metal plate such as an aluminum plate. Any provisional support may be used as long as it can be fixed during the formation of membrane.

The composition for forming a functional polymer membrane can be applied on a porous support by various methods, for example, curtain coating, extrusion coating, air knife coating, slide coating, nip roll coating, forward roll coating, reverse roll coating, immersion coating, kiss coating, rod bar coating or spray coating, or the porous support can be immersed therein. Application of plural layers can be carried out simultaneously or continuously. In order to apply plural layers simultaneously, curtain coating, slide coating, slot die coating, and extrusion coating are preferred.

In regard to the production of a functional polymer membrane in a continuous system, the functional polymer membrane is produced by continuously applying a composition for forming a functional polymer membrane on a moving support, and more preferably by means of a production unit which includes a coating unit for the composition for forming a functional polymer membrane; an irradiation source for polymerizing and curing this composition for forming a functional polymer membrane; a membrane winding unit; and a means for moving the support from the coating unit for the composition for forming a functional polymer membrane to the irradiation source and the membrane winding unit.

In the present production example, the functional polymer membrane of the invention is produced through the processes of (i) subjecting a coating liquid, which is a composition for forming a functional polymer membrane, to application and impregnation onto a support, or to at least one of application and impregnation; (ii) subjecting the composition for forming a functional polymer membrane to a polymerization curing reaction by light irradiation; and (iii) detaching the membrane from the support as desired.

[Irradiation of Active Radiation]

In the production unit described above, the coating unit for the composition for forming a functional polymer membrane is disposed at a position upstream of the irradiation source of active radiation, and the irradiation source is disposed at a position upstream of the composite membrane winding unit.

In order to have sufficient fluidity for coating with a high speed coating machine, the viscosity at 35° C. of the composition for forming a functional polymer membrane is preferably less than 4000 mPa·s, more preferably 1 to 1000 mPa·s, and most preferably 1 to 500 mPa·s. In the case of a coating method such as slide bead coating, the viscosity at 35° C. is preferably 1 to 100 mPa·s.

In a high speed coating machine, the composition for forming a functional polymer membrane can be applied on a moving support at a speed of higher than 15 m/min, and coating can also be achieved at a speed of higher than 400 m/min at the maximum.

Particularly, in the case of using a support in order to increase the mechanical strength of the membrane, the support may be subjected to a corona discharge treatment, a glow discharge treatment, a flame treatment, an ultraviolet irradiation treatment or the like, before the composition for forming a functional polymer membrane is applied on the surface of the support, for example, in order to improve wettability and a force of adhesion to the support.

During the polymerization curing reaction, the polymerizable compound represented by Formula (II) is polymerized and forms a polymer. The polymerization curing reaction can be carried out by light irradiation, under the condition that polymerization and curing occurs with sufficient rapidness for forming the membrane within 30 seconds.

The polymerization curing reaction of the composition for forming a functional polymer membrane is initiated preferably within 60 seconds, more preferably within 15 seconds, particularly preferably within 5 seconds, and most preferably within 3 seconds, after the composition for forming a functional polymer membrane is applied on the support.

The polymerization curing reaction involves irradiation of light to the composition for forming a functional polymer membrane preferably for less than 10 seconds, more preferably less than 5 seconds, particularly preferably less than 3 seconds, and most preferably less than 2 seconds. In a continuous method, irradiation is carried out continuously, and the polymerization curing reaction time is determined by the speed at which the composition for forming a functional polymer membrane passes through the irradiated beam and moves.

In the case of using ultraviolet radiation (UV light) of high intensity in the polymerization curing reaction, there is a possibility that a significant amount of heat may be generated. Thus, in order to prevent overheating, it is preferable to cool the lamp of the light source and the support coated with the composition for forming a functional polymer membrane, or at least one of the lamp of the light source and the support coated with the composition for forming a functional polymer membrane, using cooling air or the like. When a significant radiation dose of infrared light (IR light) is irradiated together with a UV beam, it is preferable to irradiate UV light using an IR-reflective quartz plate as a filter.

The active radiation is preferably ultraviolet radiation or an electron beam, and ultraviolet radiation is more preferred. It is preferable that the irradiation wavelength matches the absorption wavelength of any photopolymerization initiator that is included in the composition for forming a functional polymer membrane, and for example, the irradiation wavelength is UV-A (400 to 320 nm), UV-B (320 to 280 nm), or UV-C (280 to 200 nm).

Examples of the ultraviolet radiation source include a mercury arc lamp, a carbon arc lamp, a low pressure mercury lamp, a medium pressure mercury lamp, a high pressure mercury lamp, a swirl-flow plasma arc lamp, a metal halide lamp, a xenon lamp, a tungsten lamp, a halogen lamp, a laser, and an ultraviolet light emitting diode. A medium pressure or high pressure mercury vapor type ultraviolet light emitting lamp is particularly preferred. In addition to this, in order to modify the light emission spectrum of the lamp, additives such as a metal halide may be incorporated. In most cases, a lamp having a maximum emission at 200 to 450 nm is particularly suitable.

The energy output of the irradiation source is preferably 20 to 1,000 W/cm, and preferably 40 to 500 W/cm; however, the energy output may be higher than this range or lower than this range as long as a desired exposure dose can be realized. The degree of curing of the membrane can be adjusted by modifying the exposure intensity. The exposure dose is measured by a High Energy UV Radiometer (UV Power Puck™ from EIT Instrument Markets, Inc.), in the UV-B range indicated by the relevant apparatus, and the exposure dose is preferably at least 40 mJ/cm$^2$, more preferably 100 to 2,000 mJ/cm$^2$, and most preferably 150 to 1,500 mJ/cm$^2$. The exposure time can be freely selected; however, a shorter exposure time is preferred, and the exposure time is most preferably less than 2 seconds.

Meanwhile, if the coating speed is fast, plural light sources may be used in order to achieve a desired exposure dose. In this case, the plural light sources may have identical or different exposure doses.

[Polymerization and Curing by Heating]

The heating temperature is preferably 30° C. to 95° C., more preferably 35° C. to 90° C., and particularly preferably 40° C. to 85° C.

The heating temperature is preferably 30 minutes to 12 hours, more preferably 60 minutes to 6 hours, and particularly preferably 60 minutes to 4 hours.

[Separation Membrane Module/Ion Exchange Apparatus]

It is preferable that the functional polymer membrane of the invention is produced as a composite membrane combined with a porous support, and it is more preferable to produce a separation membrane module which uses this composite membrane. Furthermore, an ion exchange apparatus having a means intended for ion exchange, desalination or purification can be produced using the functional polymer membrane of the invention, a composite membrane, or a functional polymer membrane module. The functional polymer membrane can also be suitably used for a fuel cell.

The functional polymer membrane of the invention can be suitably used in a module form. Examples of the module include modules of spiral type, hollow fiber type, pleated type, tubular type, plate and frame type, and stacked type.

The functional polymer membrane of the invention is mainly intended to be used for ion exchange in particular. However, the functional polymer membrane of the invention is not intended to be limited to ion exchange, and it is considered that the functional polymer membrane can also be suitably used for proton conductive membranes for fuel cells, and the removal of proteins and viruses.

EXAMPLES

Hereinafter, the present invention will be described in more detail by way of Examples; however, the invention is not intended to be limited to these Examples. Meanwhile, unless particularly stated otherwise, the units "parts" and "percent (%)" in the description are on a mass basis.

1. Synthesis Examples (1) Synthesis of Polymerizable Compound Represented by Formula (II)

<Synthesis of Polymerizable Compounds (M-1) and (M-11)>

Polymerizable compounds (M-1) and (M-11) were synthesized according to the following synthesis scheme.

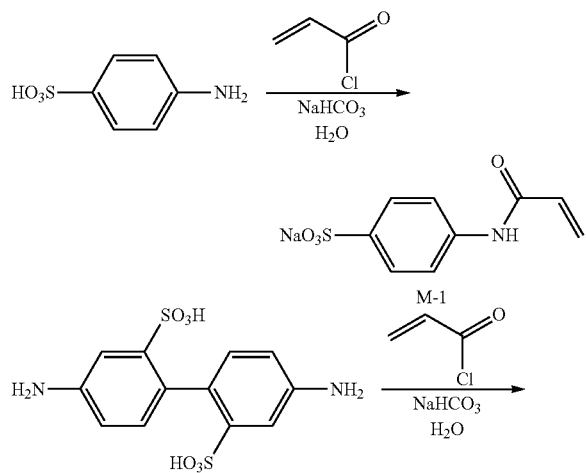

-continued

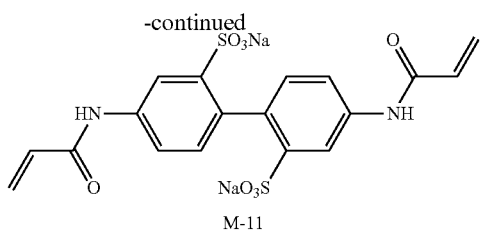

M-11

Synthesis of Polymerizable Compound (M-1)

168 g (2.0 mol) of sodium hydrogen carbonate (manufactured by Wako Pure Chemical Industries, Ltd., product No. 195-01303) and 865 mL of ion-exchanged water were introduced into a 2-L three-necked flask, and while the mixture was stirred at room temperature, 173.19 g (1.0 mol) of sulfanilic acid (manufactured by Wako Pure Chemical Industries, Ltd., product No 194-04535) was added in small proportions. After the mixture was stirred for 30 minutes at room temperature, the mixture was cooled under ice cooling, and stirring was continued. While the mixture was stirred under ice cooling, 80.8 mL (1.0 mol) of acryloyl chloride (manufactured by Wako Pure Chemical Industries, Ltd., product No. 013-12485) was slowly added dropwise thereto so as to maintain the temperature inside the system at 10° C. or lower. After completion of the dropwise addition, the mixture was stirred for 1 hour under ice cooling, and then for 3 hours at room temperature. The reaction mixture was transferred to a 5-L three-necked flask, subsequently 1500 ml of isopropyl alcohol was added thereto in small proportions, and crystals thus obtained were filtered. The crystals were washed with 300 ml of isopropyl alcohol, and 100 g (yield: 40%) of an intended polymerizable compound (M-1) was obtained.

$^1$H-NMR (300 MHz, DMSO-d6) δ: 10.2 (s, 1H), 7.62 (d, J=9.0 Hz, 2H), 7.56 (d, J=9.0 Hz, 2H), 6.45 (dd, J=10.5, 16.8 Hz, 1H), 6.27 (dd, J=2.1, 16.8 Hz, 2H), 5.76 (dd, J=2.1, 10.5 Hz, 2H)

Synthesis of Polymerizable Compound (M-11)

288.29 g (3.43 mol) of sodium hydrogen carbonate (manufactured by Wako Pure Chemical Industries, Ltd., product No. 195-01303) and 1,343 mL, of ion-exchanged water were introduced into a 5-L three-necked flask, and while the mixture was stirred at room temperature, 268.6 g (0.78 mol) of 4,4'-benzidine-2,2'-disulfonic acid (manufactured by Tokyo Chemical Industry Co., Ltd., product No: B0395) was added thereto in small proportions. After the mixture was stirred for 30 minutes at room temperature, the mixture was cooled under ice cooling, and stirring was continued. While the mixture was stirred under ice cooling, 138.7 mL (1.53 mol) of acryloyl chloride (manufactured by Wako Pure Chemical Industries, Ltd., product No. 013-12485) was slowly added dropwise thereto so as to maintain the temperature inside the system at 10° C. or lower. After completion of the dropwise addition, the mixture was stirred for 1 hour under ice cooling, and then for 3 hours at room temperature. 2,686 mL of isopropyl alcohol was added to the reaction mixture in small proportions, and then any insoluble materials generated therein were removed by filtration. A filtrate thus obtained was transferred to a 30-L stainless steel bucket, and while the filtrate was stirred at room temperature, 10,744 mL of isopropyl alcohol was added thereto in small proportions. Crystals thus obtained were filtered, and then the crystals were washed with 1,074 mL of a mixed solution of isopropyl alcohol:water (5:1).

Thus, 339 g (yield: 87%) of an intended polymerizable compound (M-11) was obtained.

$^1$H-NMR (300 MHz, DMSO-d6) δ: 10.3 (s, 2H), 8.09 (d, J=2.4 Hz, 2H), 7.71 (dd, J=2.4, 8.4 Hz, 2H), 7.16 (d, J=8.4 Hz, 2H), 7.71 (dd, J=2.4, 8.4 Hz, 2H)

A polymerizable compound (M-10) was synthesized in the same manner as in the synthesis method for the polymerizable compound (M-1), and polymerizable compounds (M-14), (M-15), (M-16), (M-17), (M-19), (M-20), (M-21), and (M-22) were synthesized in the same manner as in the synthesis method for the polymerizable compound (M-11). The raw materials of the polymerizable compound (M-14) can be provided according to the descriptions of JP2004-155998A and JP2005-085726A, or by making reference thereto, and the polymerizable compound (M-15) can be synthesized using the methods described in JP2003-064048A and JP2003-064181A.

(2) Synthesis of Compound Represented by Formula (MA)

Synthesis of Compound (MA-1)

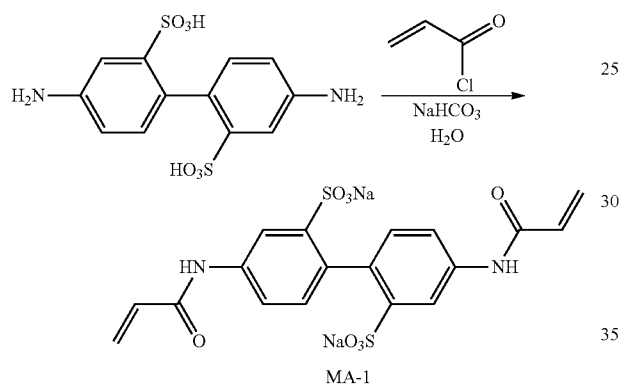

MA-1

Synthesis of Compound (MA-1)

288.29 g (3.43 mol) of sodium hydrogen carbonate (manufactured by Wako Pure Chemical Industries, Ltd., product No. 195-01303) and 1,343 mL of ion-exchanged water were introduced into a 5-L three-necked flask, and while the mixture was stirred at room temperature, 268.6 g (0.78 mol) of 4,4'-benzidine-2,2'-disulfonic acid (manufactured by Tokyo Chemical Industry Co., Ltd., product No: B0395) was added thereto in small proportions. After the mixture was stirred for 30 minutes at room temperature, the mixture was cooled under ice cooling, and stirring was continued. While the mixture was stirred under ice cooling, 138.7 mL (1.53 mol) of acryloyl chloride (manufactured by Wako Pure Chemical Industries, Ltd., product No. 013-12485) was slowly added dropwise thereto so as to maintain the temperature inside the system at 10° C. or lower. After completion of the dropwise addition, the mixture was stirred for 1 hour under ice cooling, and then for 3 hours at room temperature. 2,686 mL of isopropyl alcohol was added to the reaction mixture in small proportions, and then any insoluble materials generated therein were removed by filtration. A filtrate thus obtained was transferred to a 30-L stainless steel bucket, and while the filtrate was stirred at room temperature, 10,744 mL of isopropyl alcohol was added thereto in small proportions. Crystals thus obtained were filtered, and then the crystals were washed with 1,074 nil of a mixed solution of isopropyl alcohol:water (5:1). Thus, 339 g (yield: 87%) of an intended polymerizable compound (M-1) was obtained. The percentage of water content in the compound (MA-1) as measured by the Karl-Fischer method was 15.8% by mass.

$^1$H-NMR (300 MHz, DMSO-d6) δ: 10.3 (s, 2H), 8.09 (d, J=2.4 Hz, 2H), 7.71 (dd, J=2.4, 8.4 Hz, 2H), 7.16 (d, J=8.4 Hz, 2H), 7.71 (dd, J=2.4, 8.4 Hz, 2H)

Synthesis of Compound (MA-2)

A compound (MA-2) was obtained by neutralizing the compound (MA-1) obtained as described above, with sulfuric acid. The percentage of water content in the compound (MA-2) as measured by the Karl-Fischer method was 14.3% by mass.

2-1. Production of Cation Exchange Membrane (Examples 1 to 13 and Comparative Examples 1 to 4)

Among the polymerizable compounds (M-1, M-10, M-11, M-14 to M-17, M-19, M-20, M-21, and M-22) represented by Formula (II) of the invention synthesized as described above, compounds having one acryloyl group, which is a polymerizable group, were used as monomers for introducing an anion group, and compounds having two or more acryloyl groups were used as crosslinking agents that also functioned as monomers for introducing an anion group. Thus, cation exchange membranes were produced as follows.

Meanwhile, in Table 1, the compounds are classified into the monomer for introducing an anion group and the crosslinking agent, in order to clarify the function of the polymerizable compounds.

Example 1

A coating liquid of a composition having the composition indicated in the following Table 1 was applied manually on an aluminum plate at a speed of about 5 m/min, using a 150-μm wire-wound rod. Subsequently, a nonwoven fabric (FO-2223-10 manufactured by Freudenberg & Co. KG, thickness 100 μm) was impregnated with the coating liquid. Any excess amount of the coating liquid was removed using a rod that had no wire wound thereon. The temperature of the coating liquid at the time of application was about 40° C. The coating liquid-impregnated support was subjected to a polymerization curing reaction using a UV exposure machine (manufactured by Fusion UV Systems, Inc., LIGHT HAMMER 10, D-valve, conveyor speed 15 m/min, 100% intensity), and thereby a cation exchange membrane was produced. The polymerization and curing time was 0.8 seconds. The exposure time was 0.47 seconds. The membrane thus obtained was detached from the aluminum plate and was stored in a 0.1 M NaCl solution for at least 12 hours.

Examples 2 to 13

Cation exchange membranes of Examples 2 to 13 were produced in the same manner as in Example 1, except that the composition used in the production of the cation exchange membrane of Example 1 was changed to the respective compositions indicated in the following Table 1.

Comparative Example 1 to Comparative Example 4

Cation exchange membranes of Comparative Example 1 to Comparative Example 4 were produced in the same manner as in Example 1, except that the composition was changed to the respective compositions indicated in the following Table 1 with reference to WO2013/011272A.

2-2. Production of Cation Exchange Membrane (Examples 14 to 20, and Comparative Examples 5 and 6)

(Example 14) Production of Cation Exchange Membrane

A cation exchange membrane of Example 14 was produced in the same manner as in the production of the cation exchange membrane of Example 1, except that a coating liquid of a composition having the composition indicated in the following Table 2 was used instead of the coating liquid of the composition having the composition indicated in the following Table 1.

Examples 15 to 20

Cation exchange membranes of Examples 15 to 20 were produced in the same manner as in Example 14, except that the composition used in the production of the cation exchange member of Example 14 was changed to the respective compositions indicated in the following Table 2.

Comparative Examples 5 and 6

Cation exchange membranes of Comparative Examples 5 and 6 were produced in the same manner as in Example 14, except that the composition was changed to the respective compositions indicated in the following Table 2 with reference to WO2013/011272A.

For the cation exchange membranes produced in Examples 1 to 13 and Comparative Examples 1 to 4, the coefficient of water permeability, permselectivity, electrical resistance of the membrane, membrane mass reduction ratio after ultrasonic treatment, and pH-resistance were evaluated as follows. The results thus obtained are presented in the following Table 1. Furthermore, for the cation exchange membranes produced in Examples 14 to 20 and Comparative Examples 5 and 6, the coefficient of water permeability, permselectivity, electrical resistance of the membrane, and burst strength were evaluated as follows. The results thus obtained are presented in the following Table 2.

[Coefficient of water permeability (mL/m$^2$/Pa/hr)]

The coefficient of water permeability of the membrane was measured using an apparatus having a flow channel 10 as illustrated in FIG. 1. In FIG. 1, reference numeral 1 represents a membrane, and reference numerals 3 and 4 respectively represent flow channels for a feed solution (pure water) and a draw solution (3 M NaCl). Furthermore, the arrow of reference numeral 2 indicates the flow of water separated from the feed solution.

400 mL of a feed solution and 400 mL of a draw solution were brought into contact, with a membrane disposed therebetween (membrane contact area: 18 cm$^2$), and the respective liquids were caused to flow in the direction of the arrow of reference numeral 5 using a peristaltic pump, at a flow rate of 0.11 cm/second. The rate at which water in the feed solution penetrated to the draw solution through the membrane was analyzed by measuring the masses of the feed solution and the draw solution in real time, and thus the coefficient of water permeability was determined.

[Permselectivity]

Permselectivity was calculated by measuring the membrane potential (V) by static membrane potential measurement. Two electrolytic cells (cells) were partitioned by a membrane as an object of analysis. Before the analysis, the membrane was equilibrated for about 16 hours in a 0.05 M aqueous NaCl solution. Thereafter, 100 mL of a 0.05 M aqueous NaCl solution was poured into one of the cells partitioned by the membrane. Furthermore, 100 mL of a 0.5 M aqueous NaCl solution was poured into the other of the cells partitioned by the membrane.

After the temperature of the aqueous NaCl solutions in the cells was stabilized to 25° C. using a constant temperature water bath, the two electrolytic cells and an Ag/AgCl reference electrode (manufactured by Metrohm AG) were connected by a salt bridge while the two liquids were caused to flow toward the membrane surface, and the membrane potential (V) was measured. Then, permselectivity t was calculated by the following Equation (A).

Meanwhile, the effective area of the membrane was 1 cm$^2$.

$$t=(a+b)/2b \qquad \text{Equation (A)}$$

The details of the various symbols in Equation (A) are shown below.

a: Membrane potential (V)
b: $0.5915 \log(f_1 c_1/f_2 c_2)$ (V)
$f_1$, $f_2$: Activity coefficients of NaCl in the two cells
$c_1$, $c_2$: NaCl concentrations in the two cells (M)

[Electrical Resistance of Membrane ($\Omega \cdot cm^2$)]

Two surfaces of a membrane that had been immersed in a 0.5 M aqueous NaCl solution for about 2 hours were wiped with a dry filter paper, and the membrane was inserted into a two-chamber type cell (effective membrane area: 1 cm$^2$, a platinum electrode was used as the electrode). The two chambers were filled with 20 mL of a 0.5 M aqueous NaCl solution, and the cell was placed in a constant temperature water bath at 25° C. and left to stand therein until equilibrium was achieved. After the liquid temperature in the cells reached exactly 25° C., the electrical resistance $r_1$ was measured by means of an alternating current bridge (frequency: 1,000 Hz).

Subsequently, the membrane was removed, and the electrical resistance $r_2$ between the two poles was measured in a 0.5 M aqueous NaCl solution only. Thus, the electrical resistance of the membrane, R ($\Omega \cdot cm^2$), was determined by calculating $r_1 - r_2$.

In the following Table 1 and Table 2, the "electrical resistance of the membrane" is abbreviated to "membrane resistance".

[Membrane Mass Reduction Ratio (%) after Ultrasonic Treatment]

300 mL of ion-exchanged water was poured into a 500-mL glass beaker, and each of the cation exchange membrane produced in Examples 1 to 13 was immersed in this ion-exchanged water. Furthermore, the cation exchange membrane was ultrasonically treated for 60 minutes at 25° C. in a desktop ultrasonic cleaner 1510 manufactured by Branson Ultrasonics Corp. The membrane masses before and after the ultrasonic treatment were measured, and the membrane mass reduction ratio was calculated by the following equation. Thereby, stability of the cation exchange membranes was evaluated.

(Membrane mass before ultrasonic treatment−membrane mass after ultrasonic treatment)÷membrane mass before ultrasonic treatment×100

[pH Resistance]

Specimens of a membrane were respectively immersed in an aqueous solution of hydrochloric acid at pH 1 and an aqueous solution of sodium hydroxide at pH 14, and the membranes were maintained therein for 3 hours at 40° C. The ratio of the coefficient of water permeability of the membrane before immersion to the coefficient of water permeability of the membrane after immersion (retention ratio (%)) was calculated.

For both of the aqueous solution of hydrochloric acid at pH 1 and the aqueous solution of sodium hydroxide at pH 14, the case in which the retention ratio of the coefficient of water permeability of the membrane before and after immersion was 90% or higher was rated as "acceptable"; and the case in which the retention ratio of the membrane in any one of the liquids was less than 90% was rated as "unacceptable".

[Burst Strength ($kg/cm^2$)]

The burst strength was measured using a Mullen type burst strength tester.

For the measurement, a Mullen type burst strength tester (model L) manufactured by Toyo Seiki Seisakusho, Ltd. was used. A circular membrane having a diameter of 100 mm was cut out from each of the cation exchange membranes produced in Example 14 to Example 20 and Comparative Examples 5 and 6, and the cut membrane was used as a specimen for measurement. In this sample as a whole, pressure was applied to an arbitrary circular area having a diameter of 31.75 mm until the specimen burst, and the pressure at the time point of bursting was designated as the burst strength.

TABLE 1

| | Name/title/evaluation item | Example 1 | Example 2 | Example 3 | Example 4 | Example 5 | Example 6 | Example 7 |
|---|---|---|---|---|---|---|---|---|
| Monomer for introducing anion group | AMPS | 16.04 | 16.04 | 16.04 | 16.04 | 16.04 | 16.04 | 0 |
| | Sodium vinylbenzenesulfonate | 0 | 0 | 0 | 0 | 0 | 0 | 0 |
| | M-1 | 0 | 0 | 0 | 0 | 0 | 0 | 50.3 |
| | M-10 | 0 | 0 | 0 | 0 | 0 | 0 | 0 |
| Crosslinking agent | MBA | 0 | 0 | 0 | 0 | 0 | 0 | 12 |
| | BAMPS | 0 | 0 | 0 | 0 | 0 | 0 | 0 |
| | M-11 | 18 | 0 | 0 | 0 | 0 | 0 | 0 |
| | M-14 | 0 | 18 | 0 | 0 | 0 | 0 | 0 |
| | M-15 | 0 | 0 | 18 | 0 | 0 | 0 | 0 |
| | M-16 | 0 | 0 | 0 | 18 | 0 | 0 | 0 |
| | M-17 | 0 | 0 | 0 | 0 | 18 | 0 | 0 |
| | M-19 | 0 | 0 | 0 | 0 | 0 | 18 | 0 |
| | M-20 | 0 | 0 | 0 | 0 | 0 | 18 | 0 |
| | M-21 | 0 | 0 | 0 | 0 | 0 | 0 | 0 |
| | M-22 | 0 | 0 | 0 | 0 | 0 | 0 | 0 |
| Solvent | Water | 18.35 | 18.35 | 18.35 | 18.35 | 18.35 | 18.35 | 12.5 |
| | IPA | 0 | 0 | 0 | 0 | 0 | 0 | 18 |
| Base | NaOH | 3.09 | 3.09 | 3.09 | 3.09 | 3.09 | 3.09 | 0 |
| Stabilizer | Genorad 16 | 0.19 | 0.19 | 0.19 | 0.19 | 0.19 | 0.19 | 0.5 |
| Photoinitiator | Darocur 1173 | 0.5 | 0.5 | 0.5 | 0.5 | 0.5 | 0.5 | 0.5 |
| Membrane thickness | Membrane thickness (μm) | 133 | 132 | 134 | 135 | 132 | 133 | 130 |
| Ion exchange performance | Coefficient of water permeability ($mL/m^2/Pa/hr$) | $4.81 \times 10^{-5}$ | $4.9 \times 10^{-5}$ | $3.5 \times 10^{-5}$ | $4.7 \times 10^{-5}$ | $4.6 \times 10^{-5}$ | $3.9 \times 10^{-5}$ | $3.7 \times 10^{-5}$ |
| | Permselectivity | 0.99 | 0.98 | 0.98 | 0.98 | 0.98 | 0.98 | 0.95 |
| | Membrane resistance ($\Omega \cdot cm^2$) | 3.5 | 3.7 | 3.2 | 2.9 | 3.6 | 3.3 | 3.8 |
| Durability | Membrane mass reduction ratio (%) after ultrasonic treatment | 0.1 | 0.1 | 0.2 | 0.1 | 0.2 | 0.2 | 0.3 |
| pH resistance | pH resistance | Acceptable | Acceptable | Acceptable | Acceptable | Acceptable | Acceptable | Acceptable |

| | Name/title/evaluation item | Example 8 | Example 9 | Example 10 | Example 11 | Example 12 | Example 13 |
|---|---|---|---|---|---|---|---|
| Monomer for introducing anion group | AMPS | 0 | 16.04 | 0 | 0 | 6.04 | 6.04 |
| | Sodium vinylbenzenesulfonate | 0 | 0 | 0 | 0 | 0 | 0 |
| | M-1 | 0 | 0 | 16.04 | 0 | 0 | 0 |
| | M-10 | 50.3 | 0 | 0 | 16.04 | 0 | 0 |
| Crosslinking agent | MBA | 12 | 0 | 0 | 0 | 0 | 0 |
| | BAMPS | 0 | 0 | 0 | 0 | 0 | 0 |
| | M-11 | 0 | 18 | 18 | 18 | 0 | 0 |
| | M-14 | 0 | 0 | 0 | 0 | 0 | 0 |
| | M-15 | 0 | 0 | 0 | 0 | 0 | 0 |
| | M-16 | 0 | 0 | 0 | 0 | 0 | 0 |
| | M-17 | 0 | 18 | 0 | 0 | 0 | 0 |
| | M-19 | 0 | 0 | 0 | 0 | 0 | 0 |
| | M-20 | 0 | 0 | 0 | 0 | 0 | 0 |
| | M-21 | 0 | 0 | 0 | 0 | 28 | 0 |
| | M-22 | 0 | 0 | 0 | 0 | 0 | 28 |
| Solvent | Water | 12.5 | 12.5 | 12.5 | 12.5 | 18.35 | 18.35 |
| | IPA | 18 | 18 | 18 | 18 | 0 | 0 |
| Base | NaOH | 0 | 0 | 0 | 0 | 0 | 0 |
| Stabilizer | Genorad 16 | 0.5 | 0.5 | 0.5 | 0.5 | 0.5 | 0.5 |
| Photoinitiator | Darocur 1173 | 0.5 | 0.5 | 0.5 | 0.5 | 0.5 | 0.5 |
| Membrane thickness | Membrane thickness (μm) | 134 | 130 | 134 | 134 | 128 | 130 |
| Ion exchange performance | Coefficient of water permeability ($mL/m^2/Pa/hr$) | $3.3 \times 10^{-5}$ | $3.2 \times 10^{-5}$ | $3.1 \times 10^{-5}$ | $3.1 \times 10^{-5}$ | $2.9 \times 10^{-5}$ | $2.9 \times 10^{-5}$ |
| | Permselectivity | 0.95 | 0.98 | 0.98 | 0.98 | 0.97 | 0.98 |
| | Membrane resistance ($\Omega \cdot cm^2$) | 3.3 | 3.8 | 3.9 | 3.9 | 2.7 | 2.7 |
| Durability | Membrane mass reduction ratio (%) after ultrasonic treatment | 0.3 | 0.2 | 0.2 | 0.2 | 0.1 | 0.1 |
| pH resistance | pH resistance | Acceptable | Acceptable | Acceptable | Acceptable | Acceptable | Acceptable |

TABLE 1-continued

| Name/title/evaluation item | | Comparative Example 1 | Comparative Example 2 | Comparative Example 3 | Comparative Example 4 |
|---|---|---|---|---|---|
| Monomer for introducing anion group | AMPS | 24.6 | 50.3 | 42.7 | 0 |
| | Sodium vinylbenzenesulfonate | 0 | 0 | 0 | 50.3 |
| | M-1 | 0 | 0 | 0 | 0 |
| | M-10 | 0 | 0 | 0 | 0 |
| Crosslinking agent | MBA | 0 | 12 | 8.5 | 12 |
| | BAMPS | 37.3 | 0 | 0 | 0 |
| | M-11 | 0 | 0 | 0 | 0 |
| | M-14 | 0 | 0 | 0 | 0 |
| | M-15 | 0 | 0 | 0 | 0 |
| | M-16 | 0 | 0 | 0 | 0 |
| | M-17 | 0 | 0 | 0 | 0 |
| | M-19 | 0 | 0 | 0 | 0 |
| | M-20 | 0 | 0 | 0 | 0 |
| | M-21 | 0 | 0 | 0 | 0 |
| | M-22 | 0 | 0 | 0 | 0 |
| Solvent | Water | 37.1 | 28.4 | 12.5 | 18.35 |
| | IPA | 0 | 0 | 18.1 | 0 |
| Base | NaOH | 0 | 0 | 0 | 0 |
| Stabilizer | Genorad 16 | 0.5 | 0.5 | 0.5 | 0.5 |
| Photoinitiator | Darocur 1173 | 0.5 | 0.5 | 0.5 | 0.5 |
| Membrane thickness | Membrane thickness (μm) | 183 | 173 | 163 | 150 |
| Ion exchange performance | Coefficient of water permeability (mL/m$^2$/Pa/hr) | $10.1 \times 10^{-5}$ | $13.2 \times 10^{-5}$ | $6.5 \times 10^{-5}$ | $18.2 \times 10^{-5}$ |
| | Permselectivity | 0.95 | 0.94 | 0.93 | 0.43 |
| | Membrane resistance (Ω·cm$^2$) | 4.1 | 3.2 | 4.3 | 8.3 |
| Durability | Membrane mass reduction ratio (%) after ultrasonic treatment | 0.6 | 3.9 | 3.9 | 15.1 |
| pH resistance | pH resistance | Acceptable | Unacceptable | Unacceptable | Unacceptable |

Monomer for introducing anion group

AMPS

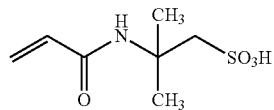

Sodium vinylbenzenesulfonate

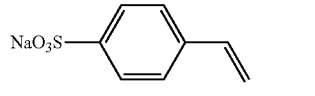

M-1

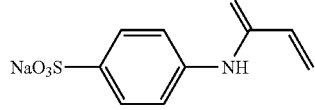

M-10

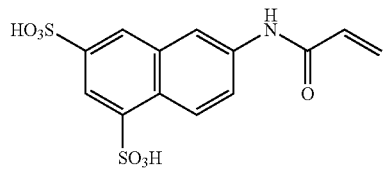

Crosslinking agent

MBA

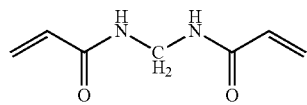

BAMPS

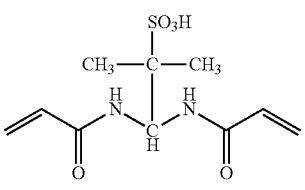

M-11

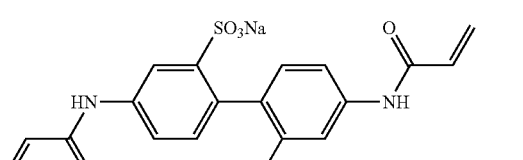

M-14

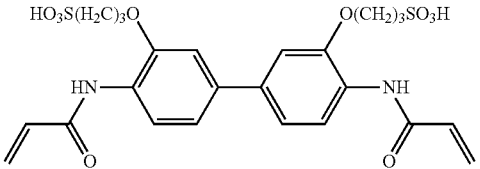

M-15

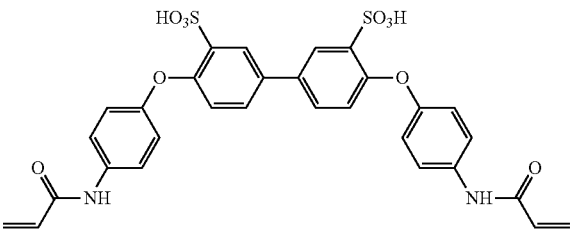

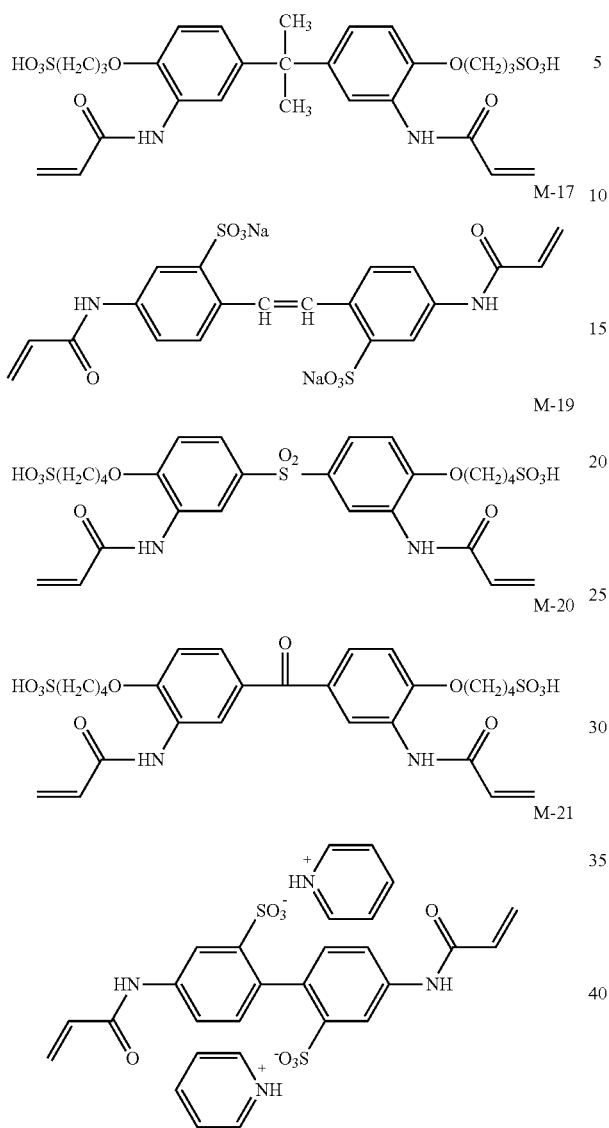
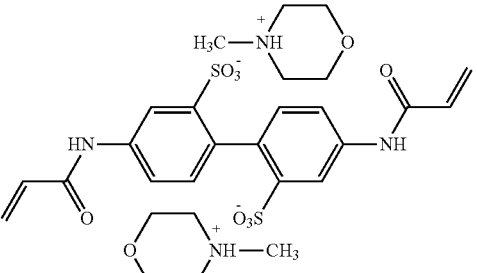

[Description of Abbreviations Used in Table 1]

Genorad 16: Trade name, manufactured by Rahn AG

Darocur 1173: Trade name, manufactured by Ciba Specialty Chemicals Corp.

IPA is isopropanol as a solvent.

As can be seen from Table 1, the cation exchange membranes of Examples 1 to 13 that contained a polymer containing a structure represented by Formula (I), which had been produced using the polymerizable compound represented by Formula (II) of the invention, all exhibited satisfactory results in relation to permselectivity, coefficient of water permeability, membrane resistance, durability (membrane mass reduction ratio after ultrasonic treatment), and pH resistance. On the contrary, the cation exchange membranes of Comparative Examples that used crosslinking agents which were conventionally known polymerizable compounds, were inferior to the cation exchange membranes of Examples 1 to 13 in relation to the coefficient of water permeability, durability, and pH resistance.

Furthermore, it was understood that when sodium vinylbenzenesulfonate was used as a cation monomer, since polymerization and curing occurred insufficiently, the membranes exhibited low performance in connection with both the coefficient of water permeability and the membrane resistance.

TABLE 2

| | Example 14 | Example 15 | Example 16 | Example 17 | Example 18 | Example 19 | Example 20 | Comparative Example 5 | Comparative Example 6 |
|---|---|---|---|---|---|---|---|---|---|
| Water | 15.96 | 32.32 | 32.60 | 32.33 | 39.61 | 25.85 | 24.22 | 37.10 | 28.20 |
| Genorad 16 | 0.38 | 0.33 | 0.33 | 0.34 | 0.31 | 0.33 | 0.33 | 0.50 | 0.50 |
| LiOH•$H_2O$ | 6.41 | | | | | | | | 9.900 |
| NaOH | | 5.44 | 4.93 | 3.66 | 1.26 | 5.44 | 9.89 | | |
| AMPS | 32.26 | 28.25 | 25.58 | 18.96 | 6.52 | 28.25 | 28.25 | 24.600 | 15.900 |
| IPA | 5.84 | | | | | 6.46 | 6.46 | | |
| MA-1 | 38.02 | 31.71 | 34.58 | 42.72 | 50.54 | 31.71 | | | |
| MA-2 | | | | | | | 29.37 | | |
| BAMPS | | | | | | | | 37.30 | 45.00 |
| Darocur 1173 | 0.50 | 0.50 | 1.00 | 1.00 | 1.00 | 0.50 | 0.50 | 0.50 | 0.50 |
| Tego Glide 432 | 0.75 | 0.98 | 1.00 | 1.00 | 1.00 | 0.98 | 0.98 | | |
| Permselectivity | 0.99 | 0.99 | 1.00 | 1.00 | 1.00 | 0.99 | 0.99 | 0.97 | 0.97 |
| Coefficient of water permeability (mL/$m^2$/Pa/hr) | $6.7 \times 10^{-5}$ | $7.0 \times 10^{-5}$ | $5.5 \times 10^{-5}$ | $4.5 \times 10^{-5}$ | $6.5 \times 10^{-5}$ | $7.0 \times 10^{-5}$ | $7.2 \times 10^{-5}$ | $9.8 \times 10^{-5}$ | $9.5 \times 10^{-5}$ |
| Membrane resistance ($\Omega \cdot cm^2$) | 1.9 | 1.8 | 2.0 | 2.3 | 1.8 | 1.9 | 1.8 | 2.8 | 2.2 |

TABLE 2-continued

| | Example 14 | Example 15 | Example 16 | Example 17 | Example 18 | Example 19 | Example 20 | Comparative Example 5 | Comparative Example 6 |
|---|---|---|---|---|---|---|---|---|---|
| Membrane thickness (μm) | 130 | 132 | 132 | 132 | 130 | 130 | 133 | 135 | 133 |
| Burst strength (kg/cm$^2$) | 3.1 | 3.1 | 3.2 | 3.3 | 3.3 | 3.1 | 3.1 | 2.8 | 2.9 |
| Coefficient of water permeability/(1/membrane resistance) | $13 \times 10^{-5}$ | $13 \times 10^{-5}$ | $11 \times 10^{-5}$ | $10 \times 10^{-5}$ | $11.7 \times 10^{-5}$ | $13 \times 10^{-5}$ | $13 \times 10^{-5}$ | $27 \times 10^{-5}$ | $21 \times 10^{-5}$ |
| Polyfunctional compound/(all polymerizable compounds) [molar proportion] | 0.30 | 0.29 | 0.33 | 0.45 | 0.74 | 0.29 | 0.29 | 0.53 | 0.68 |

Monofunctional compound

AMPS

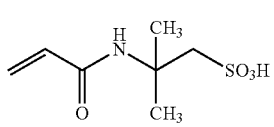

Polyfunctional compound

MA-1

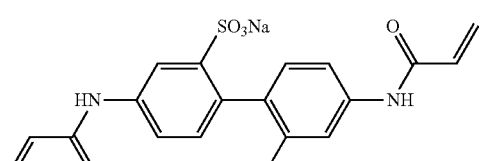

MA-2

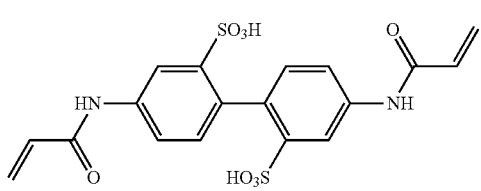

BAMPS

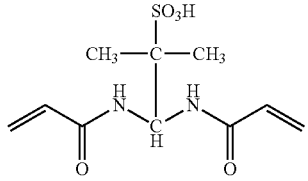

[Description of Abbreviations Used in Table 2]

Genorad 16: Trade name, manufactured by Rahn AG

Darocur 1173: Trade name, manufactured by Ciba Specialty Chemicals Corp.

Tego Glide 432: Trade name, Evonik Industries AG

IPA is isopropanol as a solvent.

As can be seen from Table 2, the cation exchange membranes of Examples 14 to 20 that contained a polymer containing a structure represented by Formula (P1), which had been produced using the polymerizable compound represented by Formula (MA) of the invention, all exhibited satisfactory results in relation to permselectivity, coefficient of water permeability, and membrane resistance, and the values of burst strength were also as high as 3.0 kg/cm$^2$ or more. On the contrary, the cation exchange membranes of Comparative Examples 5 and 6 that used crosslinking agents which were conventionally known polymerizable compounds, were inferior to the cation exchange membranes of Examples 14 to 20 in relation to the coefficient of water permeability.

Furthermore, the values of the coefficient of water permeability/(1/membrane resistance), that is, the coefficient of water permeability/ion permeability, of the cation exchange membranes of Examples 14 to 20 were lower than the values of the coefficient of water permeability/ion permeability of the cation exchange membranes of Comparative Examples 5 and 6.

The invention has been explained together with its exemplary embodiments; however, unless particularly stated otherwise, this is not intended by any means to limit the invention to any details in the description of the invention, and it should be considered that the invention and the embodiments should be construed broadly without contradicting the spirit and scope of the invention disclosed in the attached claims.

What is claimed is:

1. A functional polymer membrane comprising a polymer containing at least a structure represented by the following Formula (I):

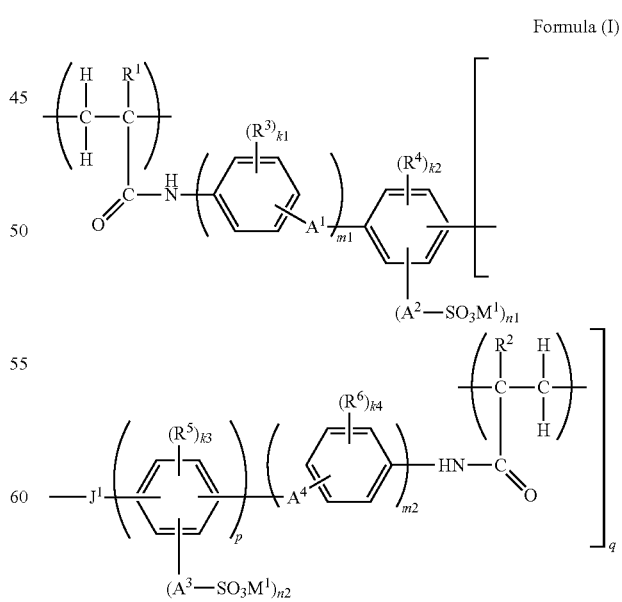

Formula (I)

wherein in Formula (I), $R^1$ and $R^2$ each independently represent a hydrogen atom or an alkyl group; $R^3$, $R^4$, $R^5$ and $R^6$ each independently represent a substituent, and k1, k2, k3 and k4 each independently represent an integer from 0 to 4; in the case where $R^3$, $R^4$, $R^5$ and $R^6$ are plural, $R^3$, $R^4$, $R^5$ and $R^6$ may be respectively identical to or different from each other, or may be bonded to each other and form a ring; $A^1$, $A^2$, $A^3$ and $A^4$ each independently represent a single bond or a divalent linking group; $M^1$ represents a hydrogen ion, an organic base ion, or a metal ion; in the case where $M^1$ is plural, $M^1$ may be identical to or different from each other; n1 and n2 each independently represent an integer from 1 to 4, and m1 and m2 each independently represent 0 or 1; $J^1$ represents a single bond, —O—, —S—, —CO—, —$CR^8R^9$—, or an alkenylene group, and $R^8$ and $R^9$ each independently represent a hydrogen atom, an alkyl group, or a halogen atom;

and p represents an integer of 1 or larger, and q represents an integer from 1 to 4.

2. A functional polymer membrane comprising a polymer containing a structure represented by the following Formula (I-1):

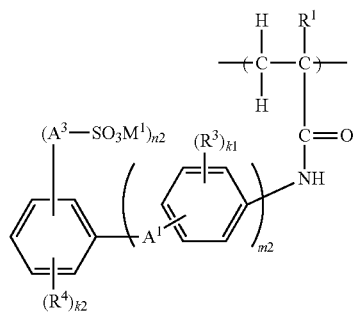

wherein in Formula (I-1), $R^1$ and $R^2$ each independently represent a hydrogen atom or an alkyl group; $R^3$, $R^4$, $R^5$ and $R^6$ each independently represent a substituent, and k1, k2, k3 and k4 each independently represent an integer from 0 to 4; in the case where $R^3$, $R^4$, $R^5$ and $R^6$ are plural, $R^3$, $R^4$, $R^5$ and $R^6$ may be respectively identical to or different from each other, or may be bonded to each other and form a ring; $A^1$, $A^2$, $A^3$ and $A^4$ each independently represent a single bond or a divalent linking group; $M^1$ represents a hydrogen ion, an organic base ion, or a metal ion; in the case where $M^1$ is plural, $M^1$ may be identical to or different from each other; n1 and n2 each independently represent an integer from 1 to 4, and m1 and m2 each independently represent 0 or 1; $J^1$ represents a single bond, —O—, —S—, —$SO_2$—, —CO—, —$CR^8R^9$—, or an alkenylene group, and $R^8$ and $R^9$ each independently represent a hydrogen atom, an alkyl group, or a halogen atom; and p represents an integer of 1 or larger, and qq represents an integer from 1 to 4.

3. The functional polymer membrane according to claim 1, wherein the membrane comprises a porous support, and the polymer containing at least a structure represented by Formula (I) is formed on at least the surface of the porous support.

4. The functional polymer membrane according to claim 3, wherein the polymer containing at least a structure represented by Formula (I) is filled in pores of the porous support.

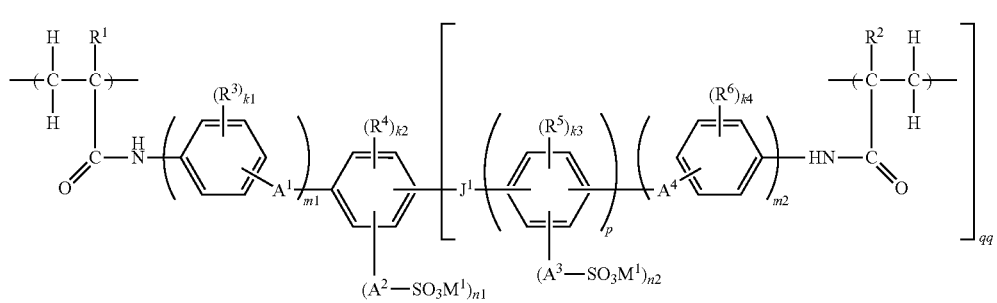

Formula (I-1)

5. The functional polymer membrane according to claim 3, wherein the porous support is a woven or non-woven fabric.

6. The functional polymer membrane according to claim 4, wherein the polymer containing at least a structure represented by Formula (I) is a polymer containing a structure represented by the following Formula (P1), the functional polymer membrane has a structure in which the polymer is on the surface of and/or embedded in the pores of the porous support, and has a burst strength of 294,300 $N/m^2$ or more:

Formula (P1)

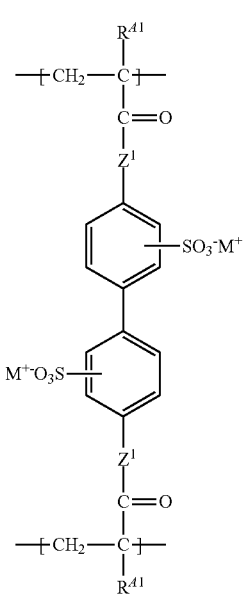

wherein in Formula (P1), $R^{41}$ represents a hydrogen atom or an alkyl group; $Z^1$ represents —O— or —NRa-, wherein Ra represents a hydrogen atom or an alkyl group; and $M^+$ represents a hydrogen ion or an alkali metal ion.

7. The functional polymer membrane according to claim 6, wherein the polymer containing a structure represented by Formula (P1) is a polymer containing a structure represented by the following Formula (CP1), which contains at least the following partial structures [A] and [B]:

Formula (CP1)

[A]
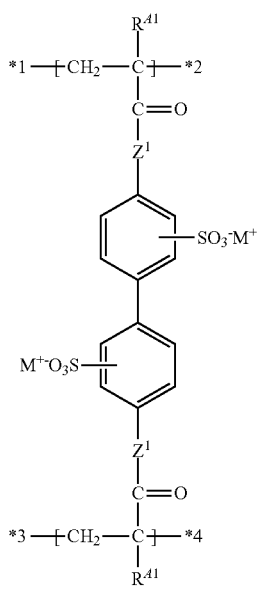

[B]
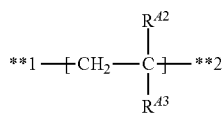

wherein in Formula (CP1), $R^{41}$, $Z^1$ and $M^+$ have the same meanings as $R^{41}$, $Z^1$ and $M^+$ in Formula (P1), respectively; and $R^{42}$ represents a hydrogen atom or an alkyl group, and $R^{43}$ represents an organic group having no ethylenically unsaturated group, wherein any one of *1 to *4 of at least one partial structure [A] is bonded to 1 or 2 of at least one partial structure [B].

8. The functional polymer membrane according to claim 7, wherein $R^{41}$ and/or $R^{42}$ are each a hydrogen atom; and $Z^1$ represents —NRa-.

9. The functional polymer membrane according to claim 1, wherein $M^1$ in Formula (I) represents an organic base ion.

10. The functional polymer membrane according to claim 6, wherein $M^+$ represents a sodium ion.

11. The functional polymer membrane according to claim 7, wherein the partial structure [A] is the following partial structure [A-1]:

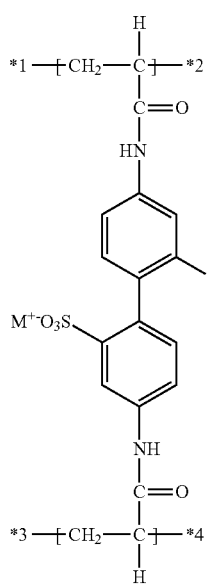

[A-1]

wherein in partial structure [A-1], $M^+$ represents a hydrogen ion or an alkali metal ion; and *1 to *4 represent sites of bonding.

12. The functional polymer membrane according to claim 7, wherein the partial structure [B] is the following partial structure [B-2]:

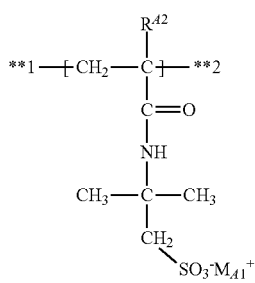
[B-2]

wherein in partial structure [B-2], $R^{A2}$, 1, and 2 have the same meanings as $R^{A2}$, 1, and 2 in the partial structure [B], respectively; and $M_{A1}^+$ represents a hydrogen ion or an alkali metal ion.

13. The functional polymer membrane according to claim 1, wherein the functional polymer membrane has a thickness of 150 μm or less.

14. The functional polymer membrane according to claim 1, wherein the functional polymer membrane is formed by subjecting a composition containing a polymerizable compound represented by the following Formula (II) to a polymerization curing reaction:

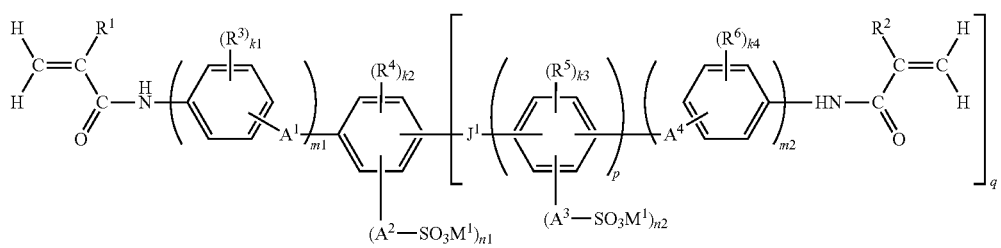
Formula (II)

wherein in Formula (II), $R^1$ and $R^2$ each independently represent a hydrogen atom or an alkyl group; $R^3$, $R^4$, $R^5$ and $R^6$ each independently represent a substituent, and k1, k2, k3 and k4 each independently represent an integer from 0 to 4; in the case where $R^3$, $R^4$, $R^5$ and $R^6$, are plural, $R^3$, $R^4$, $R^5$ and $R^6$ may be respectively identical to or different from each other, or may be bonded to each other and form a ring; $A^1$, $A^2$, $A^3$ and $A^4$ each independently represent a single bond or a divalent linking group; $M^1$ represents a hydrogen ion, an organic base ion, or a metal ion; in the case where $M^1$ is plural, $M^1$ may be identical to or different from each other; n1 and n2 each independently represent an integer from 1 to 4, and m1 and m2 each independently represent 0 or 1; $J^1$ represents a single bond, —O—, —S—, —CO—, —$CR^8R^9$—, or an alkenylene group, and $R^8$ and $R^9$ each independently represent a hydrogen atom, an alkyl group, or a halogen atom; and p represents an integer of 1 or larger, and q represents an integer from 1 to 4.

15. An ion exchange membrane comprising the functional polymer membrane according to claim 1.

16. A proton conductive membrane comprising the functional polymer membrane according to claim 6.

17. A method for producing the functional polymer membrane according to claim 14, the method comprising forming a functional polymer membrane containing a polymer containing a structure represented by the above Formula (I), by irradiating at least one polymerizable compound represented by the above Formula (II) with active radiation.

18. A method for producing a functional polymer membrane, the method comprising subjecting a composition containing a compound represented by the following Formula (MA) to a polymerization reaction on the surface of and/or in pores of a porous support, and thereby forming a crosslinked polymer containing a structure represented by the following Formula (P1) to produce a functional polymer membrane having a burst strength of 294,300 N/m² or more:

Formula (MA)

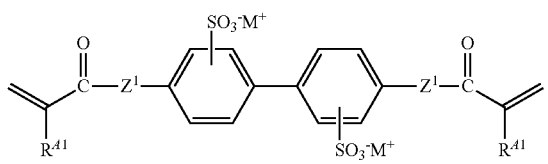

Formula (P1)

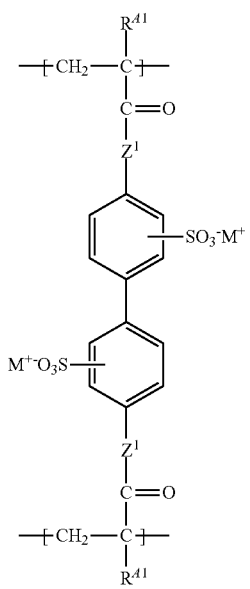
[A]

-continued wherein in Formulas (MA) and (P1), $R^{41}$ represents a hydrogen atom or an alkyl group, and $Z^1$ represents —O— or —NRa-, wherein Ra represents a hydrogen atom or an alkyl group; and M⁺ represents a hydrogen ion or an alkali metal ion.

19. The method for producing a functional polymer membrane according to claim 18, wherein the composition further includes a compound represented by the following Formula (MB), and a crosslinked polymer containing a structure represented by the following Formula (CP1) is formed by a polymerization reaction of the composition on the surface of and/or in the pores of the porous support to produce a functional polymer membrane having a burst strength of 294,300 N/m² or more:

Formula (MB)

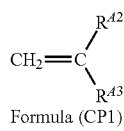

Formula (CP1)

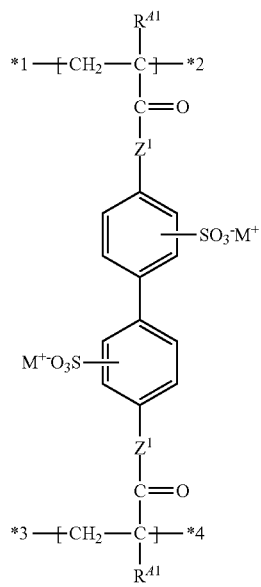

[A]

-continued

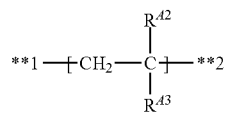

[B]

wherein in Formulas (CP1), $R^{41}$, $Z^1$, and $M^+$ have the same meanings as $R^{41}$, $Z^1$, and $M^+$ in the above Formula (P1), and in Formulas (MB), $R^{42}$ represents a hydrogen atom or an alkyl group; $R^{43}$ represents an organic group having no ethylenically unsaturated group, wherein any one of *1 to *4 of at least one partial structure [A] is bonded to 1 or 2 of at least one partial structure [B].

20. The method for producing a functional polymer membrane according to claim 18, wherein in the case where the number of moles of all the polymerizable compounds included in the composition is designated as 100, the number of moles included in the polymer represented by Formula (MA) is 28 or more.

21. The method for producing a functional polymer membrane according to claim 18, wherein the composition includes a solvent, and the content of the solvent is 5% by mass to 50% by mass.

22. The method for producing a functional polymer membrane according to claim 18, wherein the polymerization reaction is carried out under the conditions of irradiating ultraviolet radiation or an electron beam, heating, or a combination thereof.

23. An ion exchange apparatus comprising at least one of the functional polymer membranes according to claim 5.

24. The functional polymer membrane according to claim 1, wherein m1 and m2 in Formula (I) represent 0.

* * * * *